(12) United States Patent
Tabata et al.

(10) Patent No.: US 7,803,086 B2
(45) Date of Patent: Sep. 28, 2010

(54) CONTROLLER OF DRIVER FOR VEHICLES

(75) Inventors: Atsushi Tabata, Okazaki (JP); Yuji Inoue, Nisshin (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 635 days.

(21) Appl. No.: 11/816,140

(22) PCT Filed: May 26, 2006

(86) PCT No.: PCT/JP2006/311039

§ 371 (c)(1), (2), (4) Date: Aug. 13, 2007

(87) PCT Pub. No.: WO2006/126741

PCT Pub. Date: Nov. 30, 2006

(65) Prior Publication Data
US 2009/0011895 A1 Jan. 8, 2009

(30) Foreign Application Priority Data
May 26, 2005 (JP) .............................. 2005-154750

(51) Int. Cl.
B60K 17/04 (2006.01)
(52) U.S. Cl. ............................................. 477/3; 477/35
(58) Field of Classification Search ..................... 477/3, 477/20
See application file for complete search history.

(56) References Cited

U.S. PATENT DOCUMENTS

| | | | | |
|---|---|---|---|---|
| 7,481,737 B2 * | 1/2009 | Tabata et al. | .................... | 477/3 |
| 2008/0146408 A1 * | 6/2008 | Tabata et al. | .................... | 477/35 |
| 2009/0075779 A1 * | 3/2009 | Kumazaki et al. | .................... | 477/3 |
| 2010/0022346 A1 * | 1/2010 | Shibata et al. | .................... | 477/3 |

FOREIGN PATENT DOCUMENTS

| | | |
|---|---|---|
| JP | 9 152023 | 6/1997 |
| JP | 9 322312 | 12/1997 |
| JP | 11 217025 | 8/1999 |
| JP | 2000 2327 | 1/2000 |
| JP | 2000 346187 | 12/2000 |
| JP | 2003 301731 | 10/2003 |
| JP | 2004 108566 | 4/2004 |

* cited by examiner

*Primary Examiner*—Sherry Estremsky
(74) *Attorney, Agent, or Firm*—Oblon, Spivak, McClelland, Maier & Neustadt, L.L.P.

(57) ABSTRACT

A control apparatus for a vehicular drive system including (a) a differential portion having a differential mechanism operable to distribute an output of an engine to a first electric motor and a power transmitting member, a second electric motor disposed in a power transmitting path between the power transmitting member and a vehicle drive wheel, and a switching clutch and a switching brake provided in the differential mechanism and operable to limit a differential function of the differential portion, and (b) a step-variable automatic transmission portion constituting a part of the power transmitting path and operable to perform a clutch-to-clutch shifting action by a releasing action of a coupling device and an engaging action of another coupling device, the control apparatus including a step-variable shifting control configured to change an amount of racing of an input speed of the automatic transmission portion during the clutch-to-clutch shifting action, depending upon whether the differential function of the differential portion is limited by the switching clutch and brake.

23 Claims, 15 Drawing Sheets

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | SPREAD 4.76 |
| R | | | ○ | | | | ○ | 3.209 | |
| N | ○ | | | | | | | | |

○ ENGAGED
◎ ENGAGED FOR STEP-VARIABLE SHIFTING, AND RELEASED FOR CONTINUOUSLY-VARIABLE SHIFTING

| | C0 | C1 | C2 | B0 | B1 | B2 | SPEED RATIO | STEPPING RATIO |
|---|---|---|---|---|---|---|---|---|
| 1st | ◎ | ○ | | | | ○ | 2.804 | 1.54 |
| 2nd | ◎ | ○ | | | ○ | | 1.531 | 1.53 |
| 3rd | ◎ | ○ | ○ | | | | 1.000 | 1.42 |
| 4th | | ○ | ○ | ◎ | | | 0.705 | SPREAD 3.977 |
| R | | | ○ | | | ○ | 2.393 | |
| N | | ○ | | | | | | |

○ ENGAGED
◎ ENGAGED FOR STEP-VARIABLE SHIFTING, AND RELEASED FOR CONTINUOUSLY-VARIABLE SHIFTING

CONTROLLER OF DRIVER FOR VEHICLES

TECHNICAL FIELD

The present invention relates to a vehicular drive system including a differential mechanism having a differential function, and electric motors, and more particularly to techniques for reducing the sizes of the electric motors.

BACKGROUND ART

There is known a drive system for a vehicle, which includes a differential mechanism operable to distribute an output of an engine to a first electric motor and its output shaft, and a second electric motor disposed between the output shaft of the differential mechanism and a drive wheel of the vehicle. JP-2003-301731A discloses an example of such a vehicular drive system, which is a hybrid vehicle drive system. In this hybrid vehicle drive system, the differential mechanism is constituted by a planetary gear set, for example, and a major portion of a drive force of the engine is mechanically transmitted to the drive wheels through the differential function of the differential mechanism, while the rest of the drive force is electrically transmitted from the first electric motor to the second electric motor, through an electric path therebetween, so that the differential mechanism functions as a transmission the speed ratio of which is continuously variable, for example, as an electrically controlled continuously variable transmission, thereby making it possible to drive the vehicle under the control of a control device, with the engine kept in an optimum operating state with an improved fuel economy.

Generally, a continuously variable transmission is known as a transmission which permits an improved fuel economy of the vehicle, while on the other hand a gear type transmission such as a step-variable automatic transmission is known as a transmission having a high power transmitting efficiency. However, there is not available any power transmitting mechanism having the advantages of those two types of transmission. For example, the hybrid vehicle drive system disclosed in the above-identified publication JP-2003-301731A includes the electric path for transmitting an electric energy from the first electric motor to the second electric motor, namely, a power transmitting path for transmitting a portion of the vehicle drive force as an electric energy, so that the first electric motor is required to be large-sized to meet a need for an increased output of the engine, and the second electric motor driven by the electric energy generated by the first electric motor is also required to be accordingly large-sized, whereby the overall size of the hybrid vehicle drive system tends to be large-sized. It is also noted that a portion of the output of the engine is once converted into an electric energy which is subsequently converted into a mechanical energy to be transmitted to the drive wheels, whereby the fuel economy of the vehicle may possibly be deteriorated under some running condition of the vehicle, for instance, during a high-speed running of the vehicle. Where the above-described differential mechanism is a transmission the speed ratio of which is electrically variable, for example, a continuously variable transmission so-called an "electric CVT", the vehicular drive system suffers from a similar problem.

In the hybrid vehicle drive system described above, it is well known to provide a step-variable transmission in a power transmitting path between the output member of the differential mechanism (electrically controlled continuously variable transmission) and the vehicle drive wheel, for the purpose of reducing the required capacity of the second electric motor when a high vehicle drive torque is required, for thereby reducing the size of the second electric motor.

As an example of the step-variable transmission, there is well known a step-variable automatic transmission which performs clutch-to-clutch shifting actions each effected by a releasing action of a coupling device and an engaging action of another coupling device. Generally, such a clutch-to-clutch shifting action of this type of step-variable automatic transmission is effected according to a so-called "overlap control" in which overlapping of an engaging torque of the coupling device in the releasing action and an engaging torque of the coupling device in the engaging action is controlled. For instance, the overlap control is implemented to adjust the engaging pressures of the coupling devices in their releasing and engaging actions, and the timings of the releasing and engaging actions, so that an amount of a racing rise (hereinafter referred to as "racing amount") of the engine speed (input speed of the step-variable automatic transmission) is controlled to a desired value, for reducing the shifting shock and improving the shifting action as felt by the vehicle operator. Thus, the overlap control requires the racing rise of the engine speed (hereinafter referred to as "racing") during each clutch-to-clutch shifting action, so that the clutch-to-clutch shifting action is effected with the racing of the engine speed, that is, in an insufficient-overlapping state of the engaging pressures of the two coupling devices.

In the drive system including the two transmission mechanisms in the form of the differential mechanism (electrically controlled continuously variable transmission) and the step-variable automatic transmission, however, a shifting action of the step-variable transmission may cause a shifting action of the differential mechanism in response to the shifting action of the step-variable transmission, since the overall speed ratio of the drive system is determined by the speed ratios of the two transmission mechanisms. Accordingly, the drive system including the two transmission mechanisms may require a more complicated control to effect the clutch-to-clutch shifting action, than a drive system including only the step-variable automatic transmission.

When the drive system is operated as a continuously variable transmission as a whole, for example, the clutch-to-clutch shifting action of the step-variable automatic transmission which results in a stepping or non-continuous change of its speed ratio is accompanied with a shifting action of the differential mechanism to change its speed ratio in the direction opposite to that of the step-variable automatic transmission, in the inertia phase of the clutch-to-clutch shifting action in which the input speed of the step-variable automatic transmission changes in synchronization with the progress of the clutch-to-clutch shifting action. As a result, the overall speed ratio of the drive system is changed continuously in the process of the clutch-to-clutch. Thus, it is necessary to restrict a change of the engine speed in the process of the clutch-to-clutch shifting action. At the same time, the clutch-to-clutch shifting action is effected in a state of racing rise of the input speed of the step-variable automatic transmission for reducing the shifting shock. This racing rise of the input speed of the step-variable automatic transmission makes it difficult to concurrently control the shifting action of the continuously variable transmission portion so as to restrict the change of the engine speed in synchronization with the clutch-to-clutch shifting action, so that there is a risk of generation of a considerable shifting shock.

The present invention was made in view of the background art described above. It is therefore an object of this invention to provide a control apparatus for a vehicular drive system including a differential mechanism operable to perform a differential function for distributing an output of an engine to a first electric motor and its output shaft, a second electric motor disposed in a power transmitting path between the differential mechanism and a drive wheel of a vehicle, and a step-variable transmission constituting a part of the power transmitting path and operable to perform a clutch-to-clutch shifting action, the control apparatus permitting reduction of the required size or an improvement of the fuel economy of the vehicular drive system, and reduction of the shifting shock of the step-variable transmission upon the clutch-to-clutch shifting action.

DISCLOSURE OF THE INVENTION

According to a first form of the present invention, there is provided a control apparatus for (a) a vehicular drive system including a continuously-variable transmission portion operable as an electrically controlled continuously variable transmission, and a step-variable transmission portion, the continuously variable transmission portion having a differential mechanism operable to distribute an output of an engine to a first electric motor and a power transmitting member, and a second electric motor disposed in a power transmitting path between the power transmitting member and a drive wheel of a vehicle, the step-variable transmission portion constituting a part of the power transmitting path and functioning as a step-variable transmission operable to perform a clutch-to-clutch shifting action by a releasing action of a coupling device and an engaging action of another coupling device, the control apparatus being characterized by comprising (b) a differential-state limiting device provided in the differential mechanism, and operable to limit a differential function of the differential mechanism, for limiting an operation of the continuously-variable transmission portion as the electrically controlled continuously variable transmission, and (c) step-variable shifting control means configured to change an amount of racing of an input speed of the step-variable transmission portion during the clutch-to-clutch shifting action, depending upon whether the operation of the continuously-variable transmission portion as the electrically controlled continuously variable transmission is limited by the differential-state limiting device.

In the vehicular drive system constructed as described above, the continuously-variable transmission portion of the vehicular drive system is switchable by the differential limiting device, between a differential state in which the differential mechanism has the differential function without a limitation, that is, a continuously-variable shifting state in which the continuously-variable transmission portion is operable as the electrically controlled continuously variable transmission, and a non-differential state such as a locked state in which the differential mechanism does not have the differential function, that is, a non-continuously-variable shifting state in which the continuously-variable transmission portion is not operable as the electrically controlled continuously variable transmission. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the continuously-variable transmission portion is placed in the continuously-variable shifting state in a normal output state of the engine during a low-speed or medium-speed running or a low-output or medium-output running of the vehicle, for example, the fuel economy of the vehicle is improved. When the continuously-variable transmission portion is placed in the non-continuously-variable shifting state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the continuously-variable transmission portion is operated as a transmission the speed ratio of which is electrically variable. Where the continuously-variable transmission portion is placed in the non-continuously-variable shifting state during a high-output running state of the vehicle, the continuously-variable transmission portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

In the vehicular drive system including the continuously-variable transmission portion the operation of which as the electrically controlled continuously variable transmission is limited, and the step-variable transmission portion which constitutes a part of the power transmitting path between the continuously-variable transmission portion and the vehicle drive wheel, the amount of racing of the input speed of the step-variable transmission portion during the clutch-to-clutch shifting action is changed by the step-variable shifting control means, depending upon whether the operation of the continuously-variable transmission portion as the electrically controlled continuously variable transmission is limited by the differential-state limiting device. Accordingly, the clutch-to-clutch shifting action of the step-variable transmission portion can be controlled with the amount of racing of the input speed of the step-variable transmission portion which is suitably controlled depending upon whether the clutch-to-clutch shifting action takes place in a state in which the racing of the input speed of the step-variable transmission is desired with the limited operation of the continuously-variable transmission portion as the electrically controlled continuously variable transmission, or in a state in which it is desirable to prevent or minimize the racing of the input speed of the step-variable transmission portion without a limitation of the operation of the continuously-variable transmission portion as the electrically controlled continuously variable transmission. Thus, the generation of the shifting shock is reduced.

In a second form of the invention, the step-variable shifting control means changes the amount of racing of the input speed of the step-variable transmission portion during the clutch-to-clutch shifting action such that the amount of racing is smaller when the continuously-variable transmission portion is placed in a continuously-variable shifting state in which the continuously-variable transmission portion is operable to perform a continuously-variable shifting action while the operation of the continuously-variable transmission portion as the electrically controlled continuously variable transmission is limited by the differential-state limiting device, than when the continuously-variable transmission portion is placed in a non-continuously-variable shifting state in which the continuously-variable transmission portion is not operable to perform the continuously-variable shifting action while the operation of the continuously-variable transmission portion as the electrically controlled continuously variable transmission is limited by the differential-state limiting device. In other words, the amount of racing is changed to increase the amount of overlapping of the engaging torque of the coupling device in the releasing action and the engaging torque of the coupling device in the engaging action during the clutch-to-clutch shifting action of the step-variable transmission portion, when the continuously-variable transmission portion is switched to the continuously-variable shifting state. In this case, the amount of racing of the input speed of the step-variable transmission portion during its clutch-to-clutch shifting action is made smaller in the continuously-variable shifting state of the continuously-variable transmission portion than in the non-continuously-variable shifting state, so that the shifting action of the continuously-variable transmission portion in synchronization of the clutch-to-clutch shifting action of the step-variable transmission portion can be more suitably controlled, with the reduced shifting shock, in the continuously-variable shifting state of the continuously-variable transmission portion.

In a third form of the invention, the step-variable shifting control means controls the clutch-to-clutch shifting action of the step-variable transmission portion such that the clutch-to-clutch shifting action is performed in a tie-up state, when the continuously-variable transmission portion is placed in a continuously-variable shifting state in which the continuously-variable transmission portion is operable to perform a continuously-variable shifting action while the operation of the continuously-variable transmission portion as the electrically controlled continuously variable transmission is not limited by the differential-state limiting device, In this case, the amount of racing of the input speed of the step-variable transmission portion during its clutch-to-clutch shifting action is made smaller in the continuously-variable shifting state of the continuously-variable transmission portion, so that the shifting action of the continuously-variable transmission portion in synchronization of the clutch-to-clutch shifting action of the step-variable transmission portion can be more suitably controlled, with the reduced shifting shock, in the continuously-variable shifting state of the continuously-variable transmission portion.

In a fourth form of the invention, the step-variable shifting control means controls the clutch-to-clutch shifting action of the step-variable transmission portion such that the clutch-to-clutch shifting action is performed in a state of racing rise of the input speed of the step-variable transmission portion, when the continuously-variable transmission portion is placed in a non-continuously-variable shifting state in which the continuously-variable transmission portion is not operable to perform a continuously-variable shifting action while the operation of the continuously-variable transmission portion as the electrically controlled continuously variable transmission is limited by the differential-state limiting device. In this case, the clutch-to-clutch shifting action of the step-variable transmission portion is accompanied with a racing rise of the input speed of the step-variable transmission portion, in the non-continuously-variable shifting state of the continuously-variable transmission portion, so that the generation of the shifting shock can be reduced by suitably adjusting the amount of racing rise of the input speed of the step-variable transmission portion during its clutch-to-clutch shifting action.

In a fifth form of the invention, the control apparatus further comprises electric-motor control means configured to restrict a change of a speed of the engine during the clutch-to-clutch shifting action of the step-variable transmission portion, by controlling the first electric motor, in synchronization with the clutch-to-clutch shifting action, when the continuously-variable transmission portion is placed in a continuously-variable shifting state in which the continuously-variable transmission portion is operable to perform a continuously-variable shifting action while the operation of the continuously-variable transmission portion as the electrically controlled continuously variable transmission is not limited by the differential-state limiting device. In this case, the shifting action of the continuously-variable transmission portion is controlled so as to restrict a change of the engine speed during the clutch-to-clutch shifting action of the step-variable transmission portion, by controlling the first electric motor while the amount of racing rise of the input speed of the step-variable transmission portion is made smaller in the continuously-variable shifting state of the continuously-variable transmission portion than in the non-continuously-variable shifting state, so that the shifting action of the continuously-variable transmission portion can be more suitably controlled by the electric-motor control means, with the reduced shifting shock, in the continuously-variable shifting state of the continuously-variable transmission portion.

According to a sixth form of the present invention, there is provided a control apparatus for (a) a vehicular drive system including a differential portion and a step-variable transmission portion, the differential portion having a differential mechanism operable to distribute an output of an engine to a first electric motor and a power transmitting member, and a second electric motor disposed in a power transmitting path between the power transmitting member and a drive wheel of a vehicle, the step-variable transmission portion constituting a part of the power transmitting path and functioning as a step-variable transmission operable to perform a clutch-to-clutch shifting action by a releasing action of a coupling device and an engaging action of another coupling device, the control apparatus being characterized by comprising (b) a differential-state limiting device provided in the differential mechanism, and operable to limit a differential function of the differential mechanism, for limiting a differential function of the differential portion, and (c) step-variable shifting control means configured to change an amount of racing of an input speed of the step-variable transmission portion during the clutch-to-clutch shifting action, depending upon whether the differential function of the differential portion is limited by the differential-state limiting device.

In the vehicular drive system constructed as described above, the differential portion of the vehicular drive system is switchable by the differential limiting device, between a differential state in which the differential mechanism has the differential function without a limitation, that is, a continuously-variable shifting state in which the differential portion is operable as the electrically controlled continuously variable transmission, and a non-differential state such as a locked state in which the differential mechanism does not have the differential function, that is, a non-continuously-variable shifting state in which the differential portion is not operable as the electrically controlled continuously variable transmission. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the differential portion is placed in the continuously-variable shifting state in a normal output state of the engine during a low-speed or medium-speed running or a low-output or medium-output running of the vehicle, for example, the fuel economy of the vehicle is improved. When the differential portion is placed in the non-continuously-variable shifting state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the differential portion is operated as a transmission the speed ratio of which is electrically variable. Where the differential portion is placed in the non-continuously-variable shifting state during a high-output running state of the vehicle, the differential portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

In the vehicular drive system including the differential portion the operation of which as the electrically controlled continuously variable transmission is limited, and the step-variable transmission portion which constitutes a part of the power transmitting path between the differential portion and the vehicle drive wheel, the amount of racing of the input speed of the step-variable transmission portion during the clutch-to-clutch shifting action is changed by the step-variable shifting control means, depending upon whether the operation of the differential portion as the electrically controlled continuously variable transmission is limited by the differential-state limiting device. Accordingly, the clutch-to-clutch shifting action of the step-variable transmission portion can be controlled with the amount of racing of the input speed of the step-variable transmission portion which is suitably controlled depending upon whether the clutch-to-clutch shifting action takes place in a state in which the racing of the input speed of the step-variable transmission is desired with the limited operation of the differential portion as the electrically controlled continuously variable transmission, or in a state in which it is desirable to prevent or minimize the racing of the input speed of the step-variable transmission portion without a limitation of the operation of the differential portion as the electrically controlled continuously variable transmission. Thus, the generation of the shifting shock is reduced.

In a seventh form of the invention, the step-variable shifting control means changes the amount of racing of the input speed of the step-variable transmission portion during the clutch-to-clutch shifting action such that the amount of racing is smaller when the differential portion is placed in a continuously-variable shifting state in which the differential portion is operable to perform a continuously-variable shifting action while the differential function of the differential portion is not limited by the differential-state limiting device, than when the differential portion is placed in a non-continuously-variable shifting state in which the differential portion is not operable to perform the continuously-variable shifting action while the differential function of the differential portion is limited by the differential-state limiting device. In this case, the amount of racing of the input speed of the step-variable transmission portion during the clutch-to-clutch shifting action is made smaller in the continuously-variable shifting state of the differential portion, so that the shifting action of the differential portion in synchronization of the clutch-to-clutch shifting action of the step-variable transmission portion can be more suitably controlled, with the reduced shifting shock, in the continuously-variable shifting state of the differential portion.

In an eighth form of the invention, the step-variable shifting control means controls the clutch-to-clutch shifting action of the step-variable transmission portion such that the clutch-to-clutch shifting action is performed in a tie-up state, when the differential portion is placed in a continuously-variable shifting state in which the differential portion is operable to perform a continuously-variable shifting action while the differential function of the differential portion is not limited by the differential-state limiting device, In this case, the amount of racing of the input speed of the step-variable transmission portion during its clutch-to-clutch shifting action is made smaller in the continuously-variable shifting state of the differential portion, so that the shifting action of the differential portion in synchronization of the clutch-to-clutch shifting action of the step-variable transmission portion can be more suitably controlled, with the reduced shifting shock, in the continuously-variable shifting state of the differential portion.

In a ninth form of the invention, the step-variable shifting control portion controls the clutch-to-clutch shifting action of the step-variable transmission portion such that the clutch-to-clutch shifting action is performed in a state of racing rise of the input speed of the step-variable transmission portion, when the differential portion is placed in a non-continuously-variable shifting state in which the differential portion is not operable to perform a continuously-variable shifting action while the differential function of the differential portion is limited by the differential-state limiting device. In this case, the clutch-to-clutch shifting action of the step-variable transmission portion is accompanied with a racing rise of the input speed of the step-variable transmission portion, in the non-continuously-variable shifting state of the differential portion, so that the generation of the shifting shock can be reduced by suitably adjusting the amount of racing rise of the input speed of the step-variable transmission portion during its clutch-to-clutch shifting action.

In a tenth form of the invention, the control apparatus further comprises electric-motor control means configured to restrict a change of a speed of the engine during the clutch-to-clutch shifting action of the step-variable transmission portion, by controlling the first electric motor, in synchronization with the clutch-to-clutch shifting action, when the differential portion is placed in a continuously-variable shifting state in which the differential portion is operable to perform a continuously-variable shifting action while the differential function of the differential portion is not limited by the differential-state limiting device. In this case, the shifting action of the differential portion is controlled so as to restrict a change of the engine speed during the clutch-to-clutch shifting action of the step-variable transmission portion, by controlling the first electric motor while the amount of racing rise of the input speed of the step-variable transmission portion is made smaller in the continuously-variable shifting state of the differential portion than in the non-continuously-variable shifting state, so that the shifting action of the differential portion can be more suitably controlled by the electric-motor control means, with the reduced shifting shock, in the continuously-variable shifting state of the differential portion.

Preferably, the differential-state limiting device is configured to place the differential mechanism in a differential state in which the differential mechanism performs the differential function, for thereby placing the continuously-variable transmission portion in a continuously-variable shifting state in which the continuously-variable transmission portion is operable as the electrically controlled continuously variable transmission, and to place the differential mechanism in a non-differential state (for example, a locked state) in which the differential mechanism does not perform the differential function, for thereby placing the continuously-variable transmission portion in a non-continuously-variable shifting state (for example, a step-variable shifting state) in which the continuously-variable transmission portion is not operable as the electrically controlled continuously variable transmission. In this case, the continuously-variable transmission portion is switchable between the continuously-variable shifting state and the non-continuously-variable shifting state.

Preferably, the differential-state limiting device is a differential-state switching device operable to switch the differential mechanism between a differential state in which the differential mechanism performs the differential function, for thereby placing the differential portion in a differential state in which the differential portion is operable to perform a differential function, and a non-differential state (for example, a locked state) in which the differential mechanism does not perform the differential function, for thereby placing the differential portion in a non-differential state (for example, a locked state) in which the differential portion is not operable to perform a differential function.

Preferably, the differential mechanism has a first element connected to the engine, a second element connected to the first electric motor and a third element connected to the power transmitting member, and the differential limiting device is operable to place the differential mechanism in a differential state in which the first, second and third elements of the differential mechanism are rotatable relative to each other, and to place the differential mechanism in a non-differential state (for example, locked state) in which at least the second and third elements are not rotatable at respective different speeds. For example, the second and third elements are rotatable at respective different speeds in the differential state of the differential mechanism, and the first, second and third elements are rotated as a unit or the second element is held stationary in the non-differential or locked state of the differential mechanism. Thus, the differential mechanism is switchable between the differential and non-differential states.

Preferably, the differential limiting device includes a clutch operable to connect any two of the first, second and third elements of the differential mechanism to each other for rotating the first, second and third elements as a unit, and/or a brake operable to fix the second element to a stationary member for holding the second element stationary. This arrangement permits the differential mechanism to be easily switched between the differential and non-differential states.

Preferably, the clutch and brake are released to place the differential mechanism in the differential state in which at least the second and third elements are rotatable at respective different speeds, and in which the differential mechanism is operable as an electrically controlled differential device. In this case, the clutch is engaged to permit the differential mechanism to be operable as a transmission having a speed ratio of 1, or the brake is engaged to permit the differential mechanism to be operable as a speed-increasing transmission having a speed ratio lower than 1. In this arrangement, the differential mechanism is switchable between the differential state and the non-differential state, and is operable as a transmission having a single gear position with a single fixed speed ratio or a plurality of gear positions having respective fixed speed ratios.

Preferably, the differential mechanism is a planetary gear set, and the first element is a carrier of the planetary gear set, and the second element is a sun gear of the planetary gear set, while the third element is a ring gear of the planetary gear set. In this arrangement, the axial dimension of the differential mechanism can be reduced, and is simply constituted by one planetary gear device.

Preferably, the planetary gear set is of a single-pinion type. In this case, the axial dimension of the differential mechanism can be reduced, and the differential mechanism is simply constituted by one planetary gear set.

Preferably, an overall speed ratio of the vehicular drive system is defined by a speed ratio of the continuously-variable transmission portion and a speed ratio of the step-variable transmission portion. In this case, the vehicle drive force can be obtained over a relatively wide range of the overall speed ratio, by utilizing the speed ratio of the step-variable transmission portion, so that the efficiency of the continuously-variable shifting control of the continuously-variable transmission portion is further improved. Where the step-variable transmission portion is a speed-reducing transmission having a speed ratio higher than 1, the output torque of the second electric motor may be smaller than the torque of the output shaft of the step-variable transmission portion, so that the required size of the second electric motor can be reduced. The continuously-variable transmission portion placed in its continuously-variable shifting state and the step-variable transmission portion cooperate to constitute a continuously-variable transmission, while the continuously-variable transmission portion placed in the non-continuously-variable shifting state and the step-variable transmission portion cooperate to constitute a step-variable transmission.

Preferably, an overall speed ratio of the vehicular drive system is defined by a speed ratio of the differential portion and a speed ratio of the step-variable transmission portion. In this case, the vehicle drive force can be obtained over a relatively wide range of the overall speed ratio, by utilizing the speed ratio of the step-variable transmission portion, so that the efficiency of the continuously-variable shifting control of the continuously-variable transmission portion is further improved. Where the step-variable transmission portion is a speed-reducing transmission having a speed ratio higher than 1, the output torque of the second electric motor may be smaller than the torque of the output shaft of the step-variable transmission portion, so that the required size of the second electric motor can be reduced. The differential portion placed in its differential state and the step-variable transmission portion cooperate to constitute a continuously-variable transmission, while the differential portion placed in its non-differential state and the step-variable transmission portion cooperate to constitute a step-variable transmission.

Preferably, the step-variable transmission portion is a step-variable automatic transmission. In this case, the overall speed ratio of the drive system is changed in steps when the step-variable transmission portion is shifted. The change of the overall speed ratio in steps is more rapid than when the overall speed ratio is continuously changed. Accordingly, the drive system functions as a continuously variable transmission capable of smoothly changing the vehicle drive torque, and also capable of changing the speed ratio in steps for rapidly obtaining the vehicle drive torque.

EXPLANATION OF REFERENCE SIGNS

8: Engine
10, 70: Transmission mechanism (Drive system)
11: Differential portion (Continuously-variable transmission portion)
16: Power distributing mechanism (Differential mechanism)
18: Power transmitting member
20, 72: Automatic transmission portion (Step-variable transmission portion)
38: Drive wheels
40: Electronic control device (Control device)
52: Hybrid control means (Electric-motor control means)
54: Step-variable shifting control means
M1: First electric motor
M2: Second electric motor
C0: Switching clutch (Differential limiting device)
B0: Switching brake (Differential limiting device)

BEST MODE FOR CARRYING OUT THE INVENTION

The embodiments of this invention will be described in detail by reference to the drawings.

Embodiment 1

Figures 1, 2:
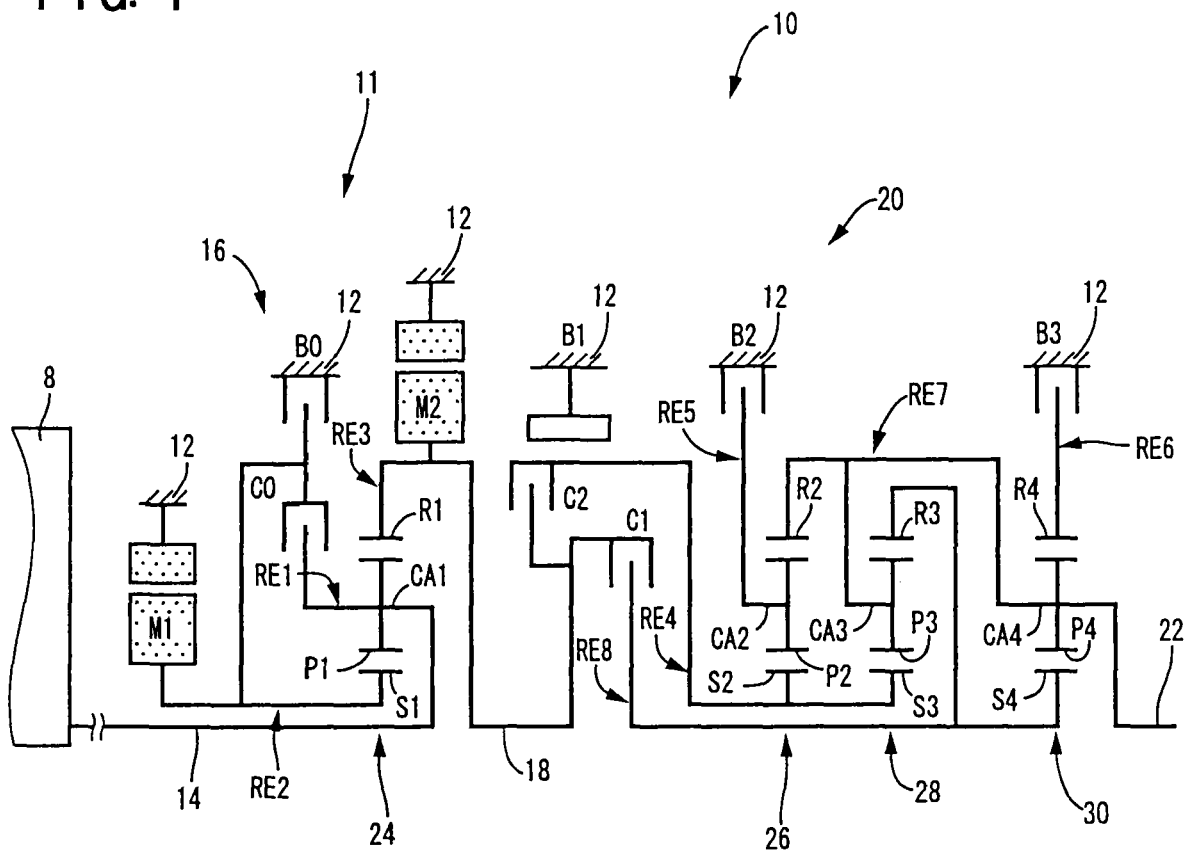
FIG. 1 is a schematic view for explaining an arrangement of a drive system of a hybrid vehicle according to one embodiment of the present invention.
FIG. 2 is a table indicating shifting actions of the hybrid vehicle drive system of FIG. 1, which is operable in a selected one of a continuously-variable shifting state and a step-variable shifting state, in relation to different combinations of operating states of hydraulically operated frictional coupling devices to effect the respective shifting actions.
Figure 5:
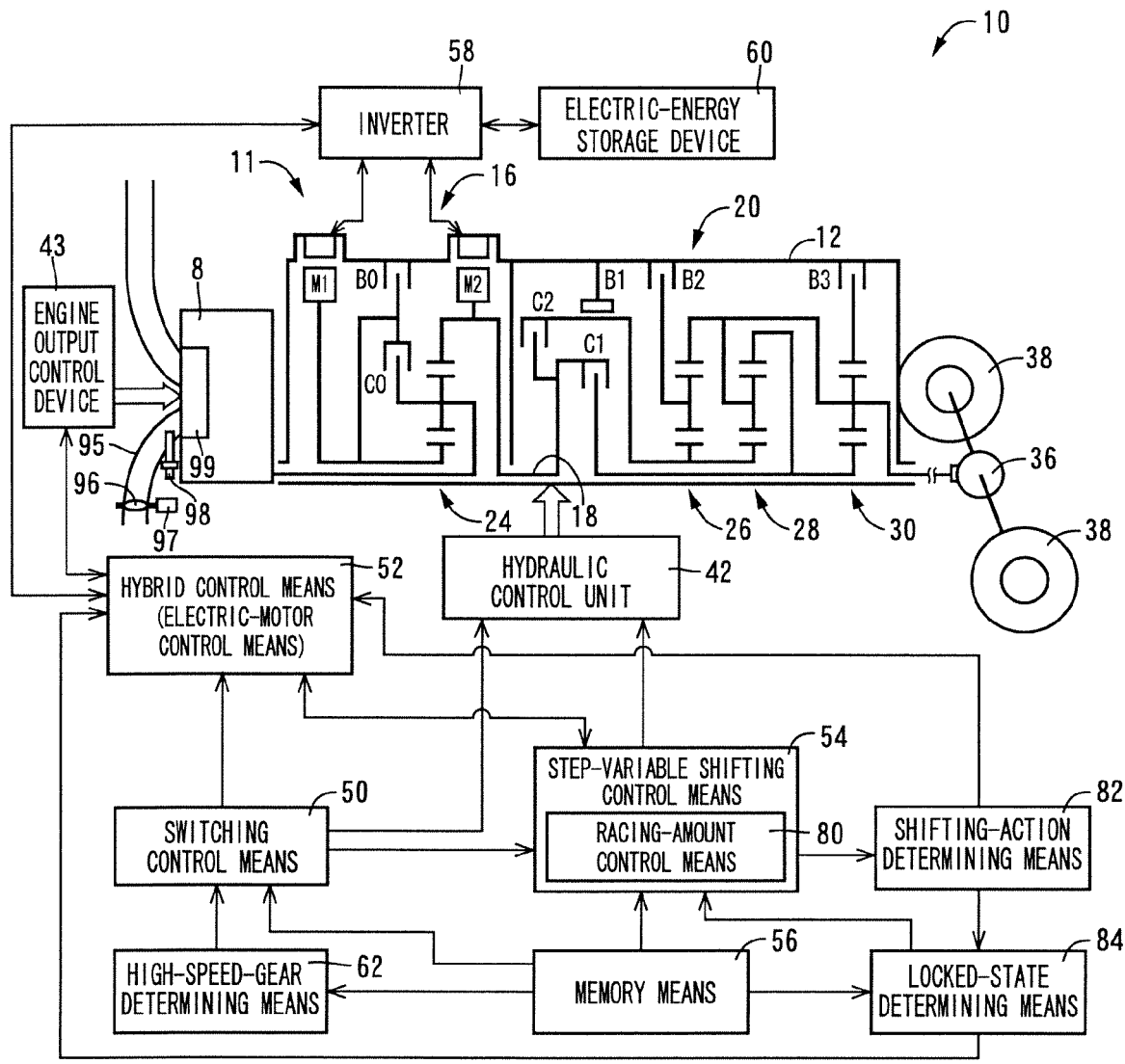
FIG. 5 is a functional block diagram illustrating major control functions of the electronic control device of FIG. 4.

FIG. 1 is a schematic view for explaining an a transmission mechanism 10 constituting a part of a drive system for a hybrid vehicle, which drive system is controlled by a control apparatus according to one embodiment of this invention. In FIG. 1, the transmission mechanism 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a step-variable or multiple-step transmission portion in the form of an automatic transmission portion 20 disposed between the differential portion 11 and drive wheels 38 of the vehicle, and connected in series via a power transmitting member 18 (power transmitting shaft) to the differential portion 11 and the drive wheels 38; and an output rotary member in the form of an output shaft 22 connected to the automatic transmission portion 20. The input shaft 14, differential portion 11, automatic transmission portion 20 and output shaft 22 are coaxially disposed on a common axis in a transmission casing 12 (hereinafter referred to as casing 12) functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles, as shown in FIG. 5. The engine 8 may be a gasoline engine or diesel engine and functions as a vehicle drive power source directly connected to the input shaft 14 or indirectly via a pulsation absorbing damper.

In the present transmission mechanism 10 described above, the engine 8 and the differential portion 11 are directly connected to each other. This direct connection means that the engine 8 and the differential portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in the schematic view of FIG. 1. This is also true to the other embodiments of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is rotated with the output shaft 22. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio $\rho 1$ of about 0.418, for example, a switching clutch C0 and a switching brake B0. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho 1$ is represented by ZS1/ZR1.

In this power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12, and the switching clutch C0 is disposed between the first sun gear S1 and the first carrier CA1. When the switching clutch C0 and brake B0 are both released, the power distributing mechanism 16 is placed in a differential state in which three elements of the first planetary gear set 24 consisting of the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the differential portion 11 (power distributing mechanism 16) functions as an electrically controlled differential device, so that the differential portion 11 is placed in the continuously-variable shifting state (electrically established CVT state), in which the rotating speed of the power transmitting member 18 is continuously variable, irrespective of the rotating speed of the engine 8, namely, placed in the differential state in which a speed ratio $\gamma 0$ (rotating speed of the input shaft 14/rotating speed of the power transmitting member 18) of the power distributing mechanism 16 is continuously changed from a minimum value $\gamma 0 min$ to a maximum value $\gamma 0 max$, that is, in the continuously-variable shifting state in which the power distributing mechanism 16 functions as an electrically controlled continuously variable transmission the speed ratio $\gamma 0$ of which is continuously variable from the minimum value $\gamma 0 min$ to the maximum value $\gamma 0 max$.

When the switching clutch C0 or brake B0 is engaged while the power distributing mechanism 16 is placed in the continuously-variable shifting state, the power distributing mechanism 16 is brought into a locked state or non-differential state in which the differential function is not available. Described in detail, when the switching clutch C0 is engaged, the first sun gear S1 and the first carrier CA1 are connected together, so that the power distributing mechanism 16 is placed in the connected or locked state in which the three rotary elements of the first planetary gear set 24 consisting of the first sun gear S1, first carrier CA1 and first ring gear R1 are rotatable as a unit, namely, placed in a non-differential state in which the differential function is not available, so that the differential portion 11 is also placed in a non-differential state. In this non-differential state, the rotating speed of the engine 8 and the rotating speed of the power transmitting member 18 are made equal to each other, so that the differential portion 11 (power distributing mechanism 16) is placed in a non-continuously-variable shifting state, for example, in a fixed-speed-ratio shifting state or step-variable shifting state in which the mechanism 16 functions as a transmission having a fixed speed ratio $\gamma 0$ equal to 1.

When the switching brake B0 is engaged in place of the switching clutch C0, the first sun gear S1 is fixed to the casing 12, so that the power distributing mechanism 16 is placed in the connected or locked state in which the first sun gear S1 is not rotatable, namely, placed in a non-differential state in which the differential function is not available, so that the differential portion 11 is also placed in the non-differential state. Since the rotating speed of the first ring gear R1 is made higher than that of the first carrier CA1, the differential portion 11 is placed in the non-continuously-variable shifting state, for example, in the fixed-speed-ratio shifting state or step-variable shifting state in which differential portion 11 (the power distributing mechanism 16) functions as a speed-increasing transmission having a fixed speed ratio $\gamma 0$ smaller than 1, for example, about 0.7.

Thus, the frictional coupling devices in the form of the switching clutch C0 and brake B0 function as a differential-state switching device operable to selectively switch the differential portion 11 (power distributing mechanism 16) between the differential state, namely, non-locked state (non-connected state) and the non-differential state, namely, locked state (connected state), that is, between the continuously-variable shifting state in which the differential portion 11 (the power distributing mechanism 16) is operable as an electrically controlled continuously variable transmission the speed ratio of which is continuously variable, and the locked state in which the differential portion 11 is not operable as the electrically controlled continuously variable transmission capable of performing a continuously-variable shifting operation, and in which the speed ratio of the differential portion 11 is held fixed, namely, the fixed-speed-ratio shifting state (non-differential state) in which the differential portion 11 is operable as a transmission having a single gear position with one speed ratio or a plurality of gear positions with respective speed ratios, namely, the fixed-speed-ratio shifting state in which the differential portion 11 is operated as a transmission having a single gear position with one speed ratio or a plurality of gear positions with respective speed ratios.

Considered from another point of view, the switching clutch C0 and switching brake B0 function as a differential limiting device operable to limit the differential function of the power distributing mechanism 16 for limiting the electric differential function of the differential portion 11, namely, the function of the differential portion 11 as the electrically controlled continuously variable transmission, by placing the power distributing mechanism 16 in its non-differential state to place the differential portion 11 in its step-variable shifting state. The switching clutch C0 and switching brake B0 are also operable to place the power distributing mechanism 16 in its differential state, for placing the differential portion 11 in its continuously-variable shifting state, in which the differential function of the power distributing mechanism 16 and the electric differential function of the differential portion 11 are not limited, namely, the function of the differential portion as the electrically controlled continuously variable transmission is not limited.

The automatic transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio $\rho2$ of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio $\rho3$ of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio $\rho4$ of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios $\rho2$, $\rho3$ and $\rho4$ are represented by ZS2/ZR2, ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1. Thus, the automatic transmission portion 20 and the power transmitting member 18 are selectively connected to each other through the first clutch C1 or the second clutch C2, which is provided to shift the automatic transmission portion 20. In other words, the first clutch C1 and the second clutch C2 function as a coupling device operable to place a power transmitting path between the power transmitting member 18 and the automatic transmission portion 20, that is, between the differential portion 11 (power transmitting member 18) and the drive wheels 38, selectively in one of a power transmitting state in which a vehicle drive force can be transmitted through the power transmitting path, and a power cut-off state in which the vehicle drive force cannot be transmitted through the power transmitting path. Described more specifically, the above-indicated power transmitting path is placed in the power transmitting state when at least one of the first clutch C1 and the second clutch C2 is placed in the engaged state, and is placed in the power cut-off state when the first clutch C1 and the second clutch C2 are placed in the released state. The automatic transmission portion 20 is a step-variable transmission which is operable to perform so-called "clutch-to-clutch shifting actions" each of which is effected by concurrent engaging and releasing actions of the appropriate two frictional coupling devices.

The above-described switching clutch C0, first clutch C1, second clutch C2, switching brake B0, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, the power distributing mechanism 16 is provided with the switching clutch C0 and the switching brake B0 one of which is engaged to place the differential portion 11 in the continuously-variable shifting state in which the differential portion 11 is operable as a continuously variable transmission, or in the non-continuously-variable shifting state (fixed-speed-ratio shifting state) in which the differential portion 11 is operable as a step-variable transmission having a fixed speed ratio or ratios. In the present transmission mechanism 10, therefore, the differential portion 11 placed in the fixed-speed-ratio shifting state by the engaging action of one of the switching clutch C0 and switching brake B0 cooperates with the automatic transmission portion 20 to constitute a step-variable transmission device, while the differential portion 11 placed in the continuously-variable shifting state with the switching clutch C0 and switching brake B0 being both held in the released state cooperates with the automatic transmission portion 20 to constitute an electrically controlled continuously variable transmission device. In other words, the transmission mechanism 10 is placed in its step-variable shifting state by engaging one of the switching clutch C0 and switching brake B0, find in its continuously-variable shifting state by releasing both of the switching clutch C0 and switching brake B0. The differential portion 11 can also be said to be a transmission which is selectively placed in one of its step-variable and continuously-variable shifting states.

Described in detail, when the transmission mechanism 10 is placed in its step-variable shifting state with the differential portion 11 placed in its step-variable shifting state with one of the switching clutch C0 and switching brake B0 held in the engaged state, one of a first gear position (first speed position) through a fifth gear position (fifth speed position), a reverse gear position (rear drive position) and a neural position is selectively established by engaging actions of a corresponding combination of the two frictional coupling devices selected from the above-described first clutch C1, second clutch C2, first brake B1, second brake B2 and third brake B3, as indicated in the table of FIG. 2. The two frictional coupling devices may consist of a frictional coupling device to be released (hereinafter referred to as "released coupling device"), and a frictional coupling device to be engaged (hereinafter referred to as "engaged coupling device"). The above-indicated positions have respective speed ratios $\gamma T$ (input shaft speed $N_{IN}$/output shaft speed $N_{OUT}$) which change as geometric series. The speed ratios $\gamma T$ are overall speed ratios of the transmission mechanism 10 determined by a speed ratio $\gamma 0$ of the differential portion 11 and a speed ratio $\gamma$ of the automatic transmission portion 20.

Where the transmission mechanism 10 functions as the step-variable transmission, for example, the first gear position having the highest speed ratio $\gamma 1$ of about 3.357, for example, is established by engaging actions of the switching clutch C0, first clutch C1 and third brake B3, and the second gear position having the speed ratio $\gamma 2$ of about 2.180, for example, which is lower than the speed ratio $\gamma 1$, is established by engaging actions of the switching clutch C0, first clutch C1 and second brake B2, as indicated in FIG. 2. Further, the third gear position having the speed ratio $\gamma 3$ of about 1.424, for example, which is lower than the speed ratio $\gamma 2$, is established by engaging actions of the switching clutch C0, first clutch C1 and first brake B1, and the fourth gear position having the speed ratio $\gamma 4$ of about 1.000, for example, which is lower than the speed ratio $\gamma 3$, is established by engaging actions of the switching clutch C0, first clutch C1 and second clutch C2. The fifth gear position having the speed ratio $\gamma 5$ of about 0.705, for example, which is smaller than the speed ratio $\gamma 4$, is established by engaging actions of the first clutch C1, second clutch C2 and switching brake B0. Further, the reverse gear position having the speed ratio $\gamma R$ of about 3.209, for example, which is intermediate between the speed ratios $\gamma 1$ and $\gamma 2$, is established by engaging actions of the second clutch C2 and the third brake B3. The neutral position N is established by engaging only the switching clutch C0.

Where the transmission mechanism 10 functions as the continuously-variable transmission with the differential portion 11 placed in its continuously-variable shifting state, on the other hand, the switching clutch C0 and the switching brake B0 indicated in FIG. 2 are both released, so that the differential portion 11 functions as the continuously variable transmission, while the automatic transmission portion 20 connected in series to the differential portion 11 functions as the step-variable transmission, whereby the speed of the rotary motion transmitted to the automatic transmission portion 20 placed in a selected gear position M, namely, the rotating speed of the power transmitting member 18 is continuously changed, so that the speed ratio of the drive system when the automatic transmission portion 20 is placed in the selected gear position M is continuously variable over a predetermined range. Accordingly, the overall speed ratio $\gamma T$ of the transmission mechanism 10 determined by the speed ratio $\gamma 0$ of the differential portion 11 and the speed ratio $\gamma$ of the automatic transmission portion 20 is continuously variable.

For example, the input speed $N_{IN}$ of the automatic transmission portion 20 placed in one of the first through fourth gear positions (or the fifth gear position established by the engaging actions of the same frictional coupling devices C1, C2 as used to establish the fourth gear position) is continuously variable in the released state of both of the switching clutch C0 and switching brake B0, as indicated in the table of FIG. 2, while the transmission mechanism 10 functions as the continuously variable transmission, so that the overall speed ratio $\gamma T$ of the transmission mechanism 10 is continuously variable across the adjacent gear positions.

Figure 3:
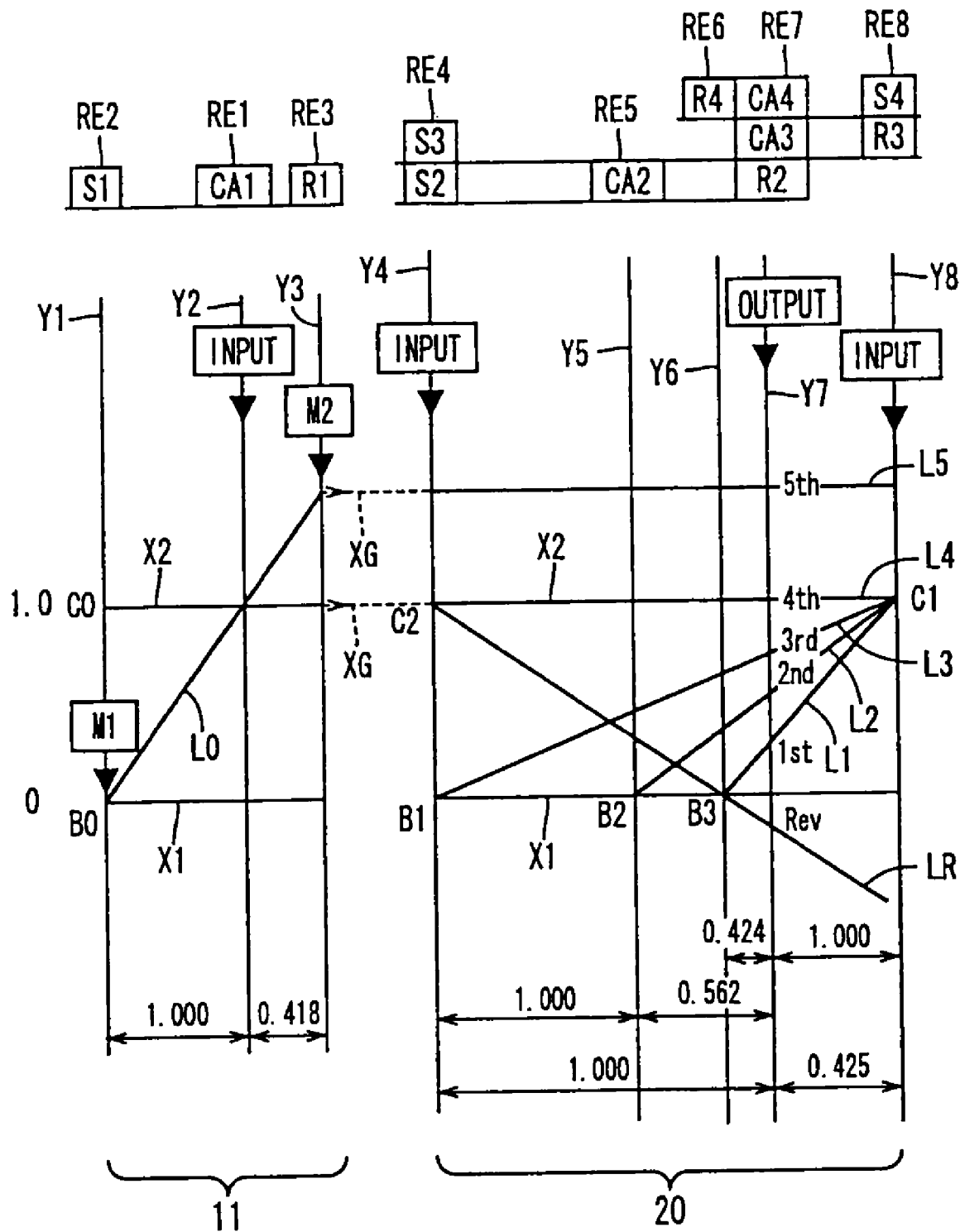
FIG. 3 is a collinear chart indicating relative rotating speeds of the hybrid vehicle drive system of FIG. 1 operated in the step-variable shifting state, in different gear positions of the drive system.

FIG. 3 is a collinear chart which indicates, by straight lines, a relationship among the rotating speeds of the rotary elements in each of the gear positions of the transmission mechanism 10, which is constituted by the differential portion 11 functioning as the continuously-variable shifting portion or first shifting portion, and the automatic transmission portion 20 functioning as the step-variable shifting portion (automatic transmission portion) or second shifting portion. The collinear chart of FIG. 3 is a rectangular two-dimensional coordinate system in which the gear ratios $\rho$ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio $\rho 1$ of the first planetary gear set 24. That is, the distance between the vertical lines Y1 and Y2 corresponds to "1", while the distance between the vertical lines Y2 and Y3 corresponds to the gear ratio $\rho 1$. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios $\rho 2$, $\rho 3$ and $\rho 4$ of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio $\rho$. In the differential portion 11, the distance between the vertical lines Y1 and Y2 corresponds to "1", while the distance between the vertical lines Y2 and Y3 corresponds to the gear ratio $\rho$. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Described by reference to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state (differential state) by releasing actions of the switching clutch C0 and brake B0, for instance, the first through third rotary elements RE1-RE3 are rotatable relative to each other, for example, at least the second rotary element RE2 and the third rotary element RE3 are rotatable relative to each other. In this case, the rotating speed of the first sun gear S1 represented by a point of intersection between the straight line L0 and the vertical line Y1 is raised or lowered by controlling the operating speed of the first electric motor M1, so that the rotating speed of the first carrier CA1 represented by the straight line L0 and the vertical line Y2, that is, the engine speed $N_E$ is raised or lowered, if the rotating speed of the first ring gear R1 determined by the vehicle speed V and represented by a point of intersection between the straight line L0 and the vertical line Y3 is substantially held constant.

When the switching clutch C0 is engaged, the first sun gear S1 and the first carrier CA1 are connected to each other, and the power distributing mechanism 16 is placed in the first non-differential state in which the above-indicated three rotary elements RE1, RE2, RE3 are rotated as a unit and the relative rotation of the second and third rotary elements RE2, RE3 is prevented, so that the straight line L0 is aligned with the horizontal line X2, so that the power transmitting member 18 is rotated at a speed equal to the engine speed $N_E$. When the switching brake B0 is engaged, on the other hand, the first sun gear S1 is fixed to the casing 12, and the power distributing mechanism 16 is placed in the second non-differential state in which the second rotary element RE2 is stopped and the relative rotation of the second and third rotary elements RE2, RE3 is prevented, so that the straight line L0 is inclined in the state indicated in FIG. 3, whereby the differential portion 11 functions as a speed increasing mechanism. Accordingly, the rotating speed of the first ring gear R1 represented by a point of intersection between the straight lines L0 and Y3, that is, the rotating speed of the power transmitting member 18 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the differential portion 11, that is, from the power distributing mechanism 16. When the switching clutch brake B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
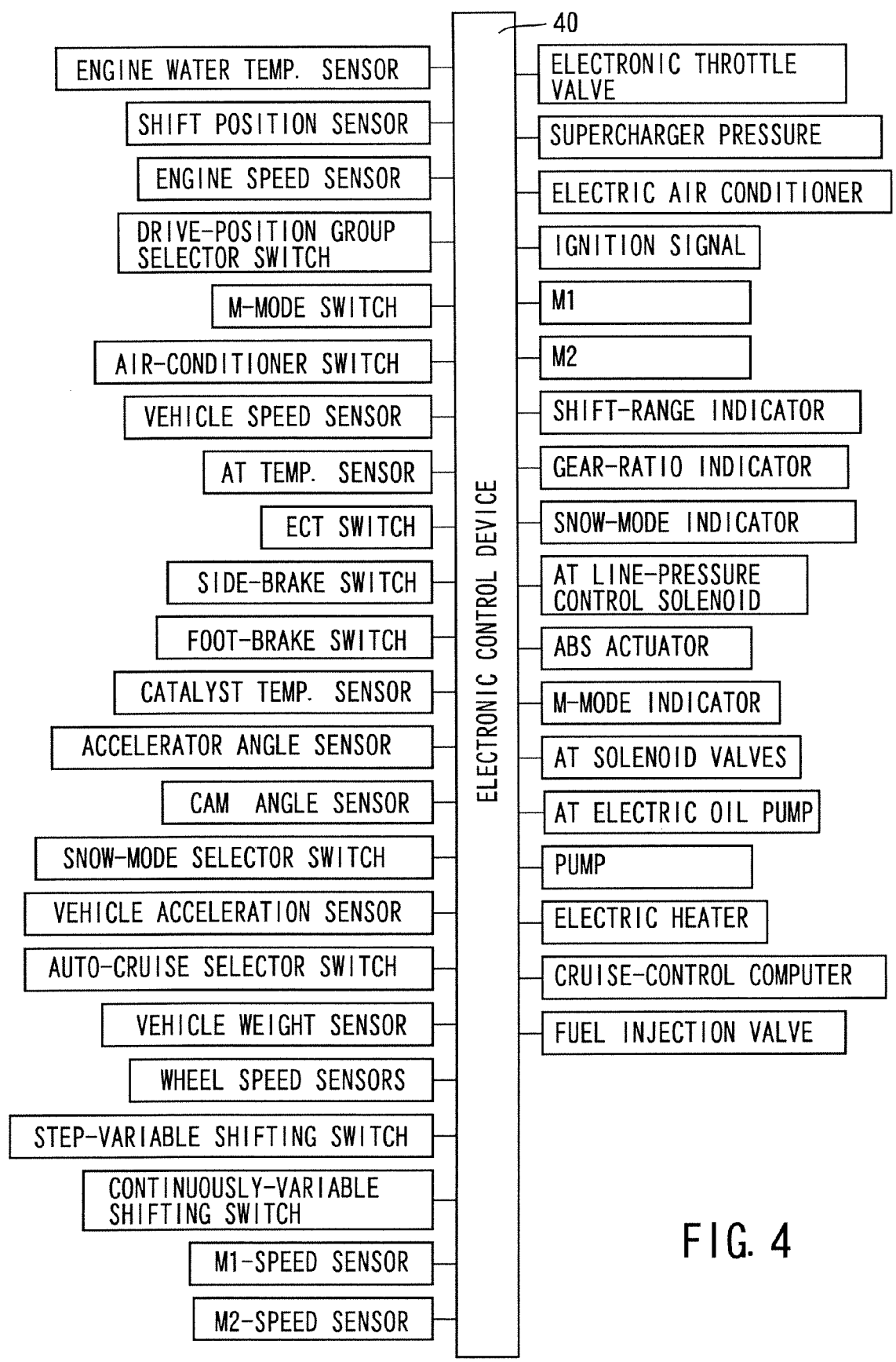
FIG. 4 is a view indicating input and output signals of an electronic control device provided in the drive system of the embodiment of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the RAM, to implement hybrid drive controls, of the engine 8 and electric motors M1 and M2, and drive controls such as shifting controls of the transmission portion 20.

The electronic control device 40 is arranged to receive various sensors and switches shown in FIG. 4, various signals such as: a signal indicative of a temperature $TEMP_W$ of cooling water of the engine 8; a signal indicative of a selected operating position $P_{SH}$ of a shift lever; a signal indicative of the operating speed $N_E$ of the engine 8; a signal indicative of a value indicating a selected group of forward-drive positions of the transmission mechanism 10; a signal indicative of an M mode (motor drive mode); a signal indicative of an operated state of an air conditioner; a signal indicative of a vehicle speed V corresponding to the rotating speed $N_{OUT}$ of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an amount of operation in the form of an angle of operation $A_{CC}$ of an accelerator pedal, which represents a vehicle output required by a vehicle operator; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the differential portion 11 (power distributing mechanism 16) in the step-variable shifting state (locked state) in which the transmission mechanism 10 functions as a step-variable transmission; a signal indicative of a continuously-variable shifting switch provided to place the differential portion 11 in the continuously variable-shifting state (differential state) in which the transmission mechanism 10 functions as the continuously variable transmission; a signal indicative of a rotating speed $N_{M1}$ of the first electric motor M1 (hereinafter referred to as "first electric motor speed $N_{M1}$"); a signal indicative of a rotating speed $N_{M2}$ of the second electric motor M2 (hereinafter referred to as "second electric motor speed $N_{M2}$"); and a signal indicative of an amount of electric energy SOC stored in (a charging state of) an electric-energy storage device 60 (shown in FIG. 5).

The electronic control device 40 is further arranged to generate various signals such as: control signals to be applied to an engine output control device 43 (shown in FIG. 5) to control the output of the engine 8, such as a drive signal to drive a throttle actuator 97 for controlling an angle of opening $\theta_{TH}$ of an electronic throttle valve 96 disposed in a suction pipe 95 of the engine 8, a signal to control an amount of injection of a fuel by a fuel injecting device 98 into the suction pipe 95 or cylinders of the engine 8, a signal to be applied to an ignition device 99 to control the ignition timing of the engine 8, and a signal to adjust a supercharger pressure of the engine 8; a signal to operate the electric air conditioner; signals to operate the electric motors M1 and M2; a signal to operate a shift-range indicator for indicating the selected operating or shift position of the shift lever 48; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 (shown in FIG. 5) provided to control the hydraulic actuators of the hydraulically operated frictional coupling devices of the differential portion 11 and automatic transmission portion 20; a signal to drive an electrically operated oil pump used as a hydraulic pressure source for the hydraulic control unit 42; a signal to drive an electric heater; and a signal to be applied to a cruise-control computer.

FIG. 5 is a functional block diagram for explaining major control functions of the electronic control device 40. A step-variable shifting control means 54 shown in FIG. 5 is arranged to determine whether a shifting action of the automatic transmission portion 20 should take place, that is, to determine the gear position to which the automatic transmission portion 20 should be shifted. This determination is made on the basis of a condition of the vehicle in the form of the vehicle speed V and an output torque $T_{OUT}$ of the automatic transmission portion 20, and according to a shifting boundary line map (shifting control map or relation) which is stored in memory means 56 and which represents shift-up boundary lines indicated by solid lines in FIG. 6 and shift-down boundary lines indicated by one-dot chain lines in FIG. 6. The step-variable shifting control means 54 generates commands (shifting commands or hydraulic control command) to be applied to the hydraulic control unit 42, to selectively engage and release the respectively two hydraulically operated frictional coupling devices (except the switching clutch C0 and brake B0), for establishing the determined gear position of the automatic transmission portion 20 according to the table of FIG. 2. Described in detail, the step-variable shifting control means 54 commands the hydraulic control unit 42 to control the solenoid-operated valves incorporated in the hydraulic control unit 42, for activating the appropriate hydraulic actuators to concurrently release one of the two frictional coupling device and engage the other frictional coupling device, to effect the clutch-to-clutch shifting actions of the automatic transmission portion 20.

A hybrid control means 52 functions as continuously-variable shifting control means and is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio $\gamma 0$ of the differential portion 11 operating as the electrically controlled continuously variable transmission, while the transmission mechanism 10 is placed in the continuously-variable shifting state, that is, while the differential portion 11 is placed in the differential state. For instance, the hybrid control means 52 calculates a target (required) vehicle output at the present running speed V of the vehicle, on the basis of the angle of operation $A_{CC}$ of the accelerator pedal used as an operator's required vehicle output and the vehicle running speed V, and calculate a target total vehicle output on the basis of the calculated target vehicle output and a required amount of generation of an electric energy by the first electric motor M1. The hybrid control means 52 calculates a target output of the engine 8 to obtain the calculated target total vehicle output, while taking account of a power transmission loss, a load acting on various devices of the vehicle, an assisting torque generated by the second electric motor M2, etc. The hybrid control means 52 controls the speed $N_E$ and torque $T_E$ of the engine 8, so as to obtain the calculated target engine output, and the amount of generation of the electric energy by the first electric motor M1.

The hybrid control means 52 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the transmission portion 20. That is, the hybrid control means 52 determines a target value of the overall speed ratio $\gamma T$ of the transmission mechanism 10, so that the engine 8 is operated according to a stored highest-fuel-economy curve (fuel-economy map or relation) stored in memory means and indicated by broken line in FIG. 7. The target value of the overall speed ratio $\gamma T$ of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the output torque $T_E$ of the engine 8 (engine torque $T_E$). The hybrid control means 52 controls the speed ratio $\gamma 0$ of the differential portion 11, so as to obtain the target value of the overall speed ratio $\gamma T$, so that the overall speed ratio $\gamma T$ can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the power transmitting member 18. Thus, the drive system is provided with an electric path through which an electric, energy generated by conversion of a portion of a drive force of the engine 8 is converted into a mechanical energy, It is noted in particular that the automatic transmission portion 20 is shifted under the control of the step-variable shifting control means 54, to change its speed ratio in steps, whereby the overall speed ratio $\gamma T$ of the transmission mechanism 10 is changed in steps. Namely, the overall speed ratio $\gamma T$ of the transmission mechanism 10 is changed due to a shifting action of the automatic transmission portion 20, in steps or non-continuously, rather than continuously as in a continuously variation transmission the speed ratio of which is continuously changed. The change of the overall speed ratio $\gamma T$ in steps permits a more rapid change of the vehicle drive force than the continuous change of the overall speed ratio $\gamma T$, but on the other hand has a risk of causing a shifting shock and deterioration of the fuel economy due to a failure of control of the engine speed $N_E$ following the highest-fuel-economy curve.

In view of the facts indicated above, the hybrid control means 52 is arranged to change the speed ratio of the differential portion 11 before and after a shifting action of the automatic transmission portion 20, so as to reduce the change of the overall speed ratio $\gamma T$ in steps due to the shifting action of the automatic transmission portion 20, that is, to cause a continuous transient change of the overall speed ratio $\gamma T$ before and after the shifting action. For example, the hybrid control means 52 is arranged to control the speed ratio of the differential portion 11 in synchronization with the shifting action of the automatic transmission portion 20, so as to reduce the amount of change of the engine speed $N_E$ as a result of the shifting action, by utilizing the electric CVT function (differential function) of the differential portion 11.

Described in detail, the hybrid control means 52 is arranged to control the speed ratio of the differential portion 11 in synchronization with the shifting action of the automatic transmission portion 20, so as to control the engine speed $N_E$ at a value not higher than a predetermined speed $N_E'$, irrespective of a change of the rotating speed of the power transmitting member 18 (second electric motor M2) that is the input speed $N_{IN}$ of the automatic transmission portion 20, which takes place due to the shifting action of the automatic transmission portion 20. The above-indicated predetermined speed $N_E'$ is a target value of the engine speed $N_E$ value used for controlling the speed ratio $\gamma 0$ of the differential portion 11 for reducing the change of the engine speed $N_E$ so as to cause a continuous transient change of the overall speed ratio $\gamma T$ before and after the shifting action of the automatic transmission portion 20. This target value is obtained by experimentation and stored in memory.

For instance, the hybrid control means 52 is arranged to change the speed ratio $\gamma 0$ of the differential portion 11 in a direction opposite to the direction of change of the speed ratio $\gamma$ of the automatic transmission portion 20, by an amount equal to the amount of change of the speed ratio $\gamma$ in steps, in synchronization with the shifting action of the automatic transmission portion 20, so as to prevent a non-continuous transient change of the overall speed ratio $\gamma T$ before an after the shifting action of the automatic transmission portion 20, that is, so as to hold the engine speed $N_E$ substantially constant before and after the shifting action of the automatic transmission portion 20, for thereby permitting a continuous change of the overall speed ratio $\gamma T$. This arrangement is effective to reduce the amount of change of the overall speed ratio $\gamma T$ in steps before and after the shifting action of the automatic transmission 20, for thereby reducing the shifting shock, in spite of the change of the speed ratio $\gamma$ of the automatic transmission 20 due to the shifting action. Thus, the hybrid control means 52 functions electric-motor control means for changing the first electric motor speed $N_{M1}$ so as to restrict a change of the engine speed $N_E$ during a shifting action of the automatic transmission portion 20, irrespective of a change of the input speed $N_{IN}$ of the automatic transmission portion 20, that is, a change of the rotating speed of the power transmitting member 18 (hereinafter referred to as "power-transmitting-member speed $N_{18}$") as a result of the shifting action of the automatic transmission portion 20.

Figure 7:
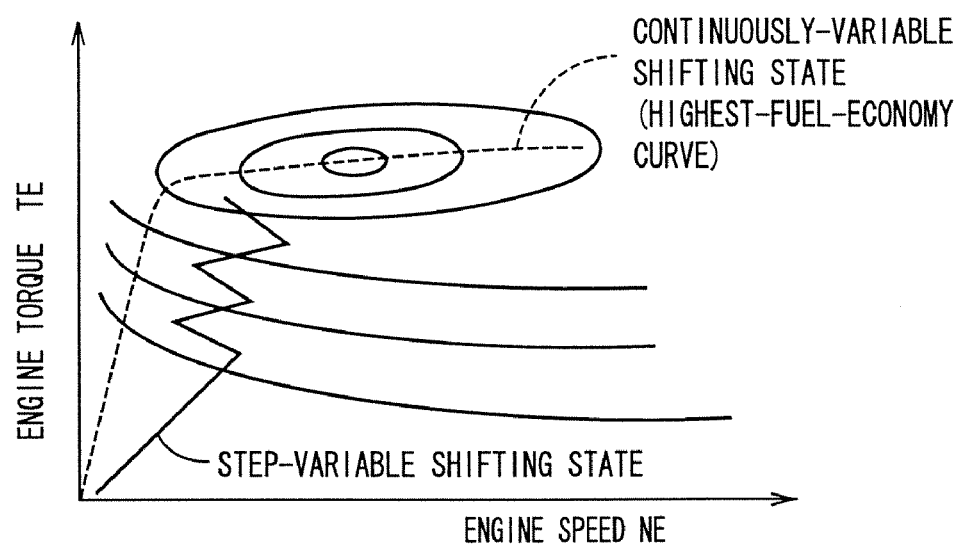
FIG. 7 is a view illustrating an example of a fuel consumption map defining a highest-fuel-economy curve of an engine, and explaining a difference between an operation of the engine in a continuously-variable shifting state (indicated by broken line) of the transmission mechanism and an operation of the engine in a step-variable shifting state (indicated by one-dot chain line) of the transmission mechanism.

Considered in another point of view, the engine 8 is generally operated with a step-variable transmission, following a one-dot chain line indicated in FIG. 7, and with a continuously variable transmission, following the highest-fuel-economy curve indicated by broken line in FIG. 7, or following a line closer to the highest-fuel-economy curve, than when the engine 8 is operated with the step-variable transmission. Accordingly, the engine torque $T_E$ for obtaining the required vehicle drive torque (drive force) is obtained at the engine speed $N_E$ which is closer to the highest-fuel-economy curve, when the engine 8 is operated with the continuously variable transmission than when it is operated with the step-variable transmission. This means that the continuously variable transmission permits a higher degree of fuel economy that the step-variable transmission. Therefore, the hybrid control means 52 is arranged to control the speed ratio $\gamma$ of the differential portion 11 such that the engine 8 is operated following the highest-fuel-economy line indicated by the broken line in FIG. 7, for preventing deterioration of the fuel economy, in spite of a change of the speed ratio of the automatic transmission portion 20 in steps due to its shifting action. This arrangement enables the transmission mechanism 10 as a whole to function as a continuously variable transmission, thereby assuring an improved fuel economy.

As described above, the hybrid control means 52 is arranged to implement a so-called "synchronous speed ratio control" of the differential portion 11 in synchronization with the shifting action of the automatic transmission portion 20. This synchronous speed ratio control is initiated at a moment which is determined by taking account of a response delay from a moment of determination by the step-variable control means 54 of a shifting action of the automatic transmission portion 20 to a moment of initiation of an actual change of the input speed $N_{IN}$ of the automatic transmission 20 caused by operations of the appropriate hydraulically operated frictional coupling devices, namely, a response delay up to a moment of initiation of a so-called "inertia phase" in which the input speed $N_{IN}$ of the automatic transmission portion 20, that is, the rotating speed of the power transmitting member 18 changes in the process of the shifting action of the automatic transmission portion 20. For example, the response delay is obtained by experimentation and stored in memory. Alternatively, the hybrid control means 52 initiates the synchronous speed ratio control of the differential portion 11 at a moment of detection of initiation of an actual change of the input speed $N_{IN}$ of the automatic transmission portion 20.

The synchronous speed ratio control of the differential portion 11 is terminated at a moment of termination of the inertia phase in the process of the shifting action of the automatic transmission portion 20. For example, a length of duration of the shifting action of the automatic transmission portion 20 is obtained by experimentation and stored in memory. Alternatively, the hybrid control means 52 terminates the synchronous speed ratio control of the differential portion 11 at a moment of detection that the actual change of the input speed $N_{IN}$ of the automatic transmission portion 20 has been zeroed.

As described above, the hybrid control means 52 implements the synchronous speed ratio control of the differential portion 11, during the time period (length of time) of the inertia phase in the process of the shifting action of the automatic transmission portion 20, for example, during a time period obtained by experimentation, or during a length of time from the moment of initiation of the actual change of the input speed $N_{IN}$ of the automatic transmission portion 20 to the moment of detection of zeroing of the actual change of the input speed $N_{IN}$. In other words, the hybrid control means 52 implements the shifting action of the differential portion 11 in the inertia phase of the shifting action of the automatic transmission portion 20, in synchronization with the shifting action of the automatic transmission portion 20.

The hybrid control means 52 is further arranged to hold the engine speed $N_E$ substantially constant or at a desired value, by controlling the first electric motor speed $N_{M1}$ and/or the second electric motor speed $N_{M2}$ owing to the electric CVT function of the differential portion 11, irrespective of whether the vehicle is stationary or running. In other words, the hybrid control means 52 is capable of controlling the first electric motor speed $N_{M1}$ and/or the second electric motor speed $N_{M2}$ as desired while holding the engine speed $N_E$ substantially constant or at a desired value.

To raise the engine speed $N_E$ during running of the vehicle, for example, the hybrid control means 52 raises the operating speed $N_{M1}$ of the first electric motor M1 since the power-transmitting-member speed $N_{18}$ is determined by the vehicle speed V (speed of the drive wheels 38), as is apparent from the collinear chart of FIG. 3. To hold the engine speed $N_E$ substantially constant during a shifting operation of the automatic transmission portion 20, the hybrid control means 52 changes the first electric motor speed $N_{M1}$ in a direction opposite to the direction of change of the second electric motor speed $N_{M2}$ caused by the shifting operation of the automatic transmission portion 20, while the engine speed $N_E$ is held substantially constant.

The hybrid control means 52 includes engine output control means functioning to control the engine 8, so as to provide a required output, by controlling the throttle actuator 97 to open and close the electronic throttle valve 96, and controlling an amount and time of fuel injection by the fuel injecting device 98 into the engine 8, and/or the timing of ignition of the igniter by the ignition device 99, alone or in combination. For instance, the hybrid control means 52 is basically arranged to control the throttle actuator 97 on the basis of the angle of operation $A_{CC}$ of the accelerator pedal and according to a predetermined stored relationship (not shown) between the angle of operation $A_{CC}$ and the opening angle $\theta_{TH}$ of the electronic throttle valve 96 such that the opening angle $\theta_{TH}$ increases with an increase of the angle of operation amount $A_{CC}$. The engine output control device 43 controls the throttle actuator 97 to open and close the electronic throttle valve 96, controls the fuel injecting device 98 to control the fuel injection, and controls the ignition device 99 to control the ignition timing of the igniter, for thereby controlling the torque of the engine 8, according to the commands received from the hybrid control means 52.

Figure 6:
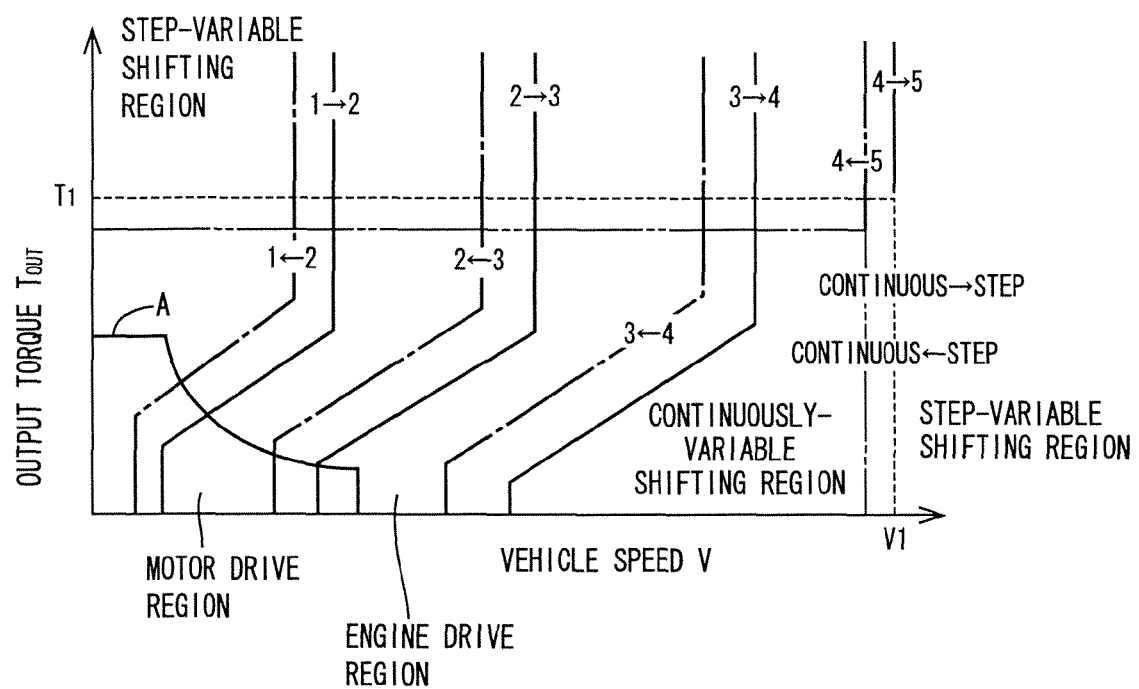
FIG. 6 is a view illustrating an example of a stored shifting boundary line map used for determining a shifting action of an automatic transmission portion, an example of a stored switching boundary line map used for switching the shifting state of a transmission mechanism, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

The hybrid control means 52 is capable of establishing a motor-drive mode to drive the vehicle by the electric motor, by utilizing the electric CVT function (differential function) of the differential portion 11, irrespective of whether the engine 8 is in the non-operated state or in the idling state. Solid line A in FIG. 6 represents an example of a boundary line defining an engine-drive region and a motor-drive region, for switching the vehicle drive power source for starting and driving (hereinafter collectively referred to as "driving") the vehicle, between the engine 8 and the electric motor (e.g., second electric motor M2). In other words, the vehicle drive mode is switchable between a so-called "engine drive mode" corresponding to the engine-drive region in which the vehicle is started and driven with the engine 8 used as the drive power source, and the so-called "motor-drive mode" corresponding to the motor-drive region in which the vehicle is driven with the second electric motor M2 used as the drive power source. A predetermined stored relationship representing the boundary line (solid line A) of FIG. 6 for switching between the engine-drive mode and the motor-drive mode is an example of a drive-power-source switching map (drive-power-source map) in a two-dimensional coordinate system defined by control parameters in the form of the vehicle speed V and a drive-force-related value in the form of the output torque $T_{OUT}$. This drive-power-source switching map is stored in the memory means 56, together with the shifting boundary line map (shifting map) indicated by solid lines and one-dot chain lines in FIG. 6.

The hybrid control means 52 determines whether the vehicle condition is in the motor-drive region or engine-drive region, and establishes the motor-drive mode or engine-drive mode. This determination is made on the basis of the vehicle condition represented by the vehicle speed V and the required output torque $T_{OUT}$, and according to the drive-power-source switching map of FIG. 6. As is understood from FIG. 6, the motor-drive mode is generally established by the hybrid control means 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. Usually, therefore, the vehicle is started in the motor-drive mode, rather than in the engine-drive mode. When the vehicle condition upon starting of the vehicle is outside the motor-drive region defined by the drive-power-source switching map of FIG. 6, as a result of an increase of the required output torque $T_{OUT}$ or engine torque $T_E$ due to an operation of the accelerator pedal 45, the vehicle may be started in the engine-drive mode.

For reducing a dragging of the engine 8 in its non-operated state and improving the fuel economy in the motor-drive mode, the hybrid control means 52 is arranged to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed 1 is controlled so as to be freely rotated to have a negative speed $N_{M1}$.

The hybrid control means 52 is further capable of performing a so-called "drive-force assisting" operation (torque assisting operation) to assist the engine 8, by supplying an electric energy from the first electric motor M1 or the electric-energy storage device 60 to the second electric motor M2, so that the second electric motor M2 is operated to transmit a drive torque to the drive wheels 38. Thus, the second electric motor M2 may be used in addition to the engine 8, in the engine-drive mode.

The hybrid control means 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOC stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control means 52 is further arranged to place the first electric motor M1 in a non-load state by cutting off an electric current applied from the electric energy storage device 60 to the first electric motor M1 through the inverter 58. When the first electric motor M1 is placed in the non-load state, the first electric motor M1 is permitted to be freely rotated, and the differential portion is placed in a state similar to the power cut-off state in which power cannot be transmitted through the power transmitting path within the differential portion 11, and no output can be generated from the differential portion 11. Namely, the hybrid control means 52 is arranged to place the first electric motor M1 in the non-load state, for thereby placing the differential portion 11 in a neutral state in which the power transmitting path is electrically cut off.

High-speed-gear determining means 62 is arranged to determine whether the gear position to which the transmission mechanism 10 should be shifted on the basis of the vehicle condition and according to the shifting boundary line map stored in the memory means 56 and indicated in FIG. 6 by way of example is a high-speed-gear position, for example, the fifth gear position. This determination is made by determining whether the gear position selected by the step-variable shifting control means 54 is the fifth gear position or not, for determining which one of the switching clutch C0 and brake B0 should be engaged to place the transmission mechanism 10 in the step-variable shifting state.

Switching control means 50 is arranged to selectively switch the transmission mechanism 10 between the continuously-variable shifting state and the step-variable shifting state, that is, between the differential state and the locked state, by engaging and releasing the coupling devices (switching clutch C0 and brake B0) on the basis of the vehicle condition. For example, the switching control means 50 is arranged to determine whether the shifting state of the transmission mechanism 10 (differential portion 11) should be changed, on the basis of the vehicle condition represented by the vehicle speed V and the required output torque $T_{OUT}$ and according to the switching boundary line map (switching control map or relation) stored in the memory means 56 and indicated by two-dot chain line in FIG. 6 by way of example, namely, whether the vehicle condition is in the continuously-variable shifting region for placing the transmission mechanism 10 in the continuously-variable shifting state, or in the step-variable shifting region for placing the transmission mechanism 10 in the step-variable shifting state. The switching control means 50 places the transmission mechanism 10 in the continuously-variable shifting state or step-variable shifting state, depending upon whether the vehicle condition is in the continuously-variable shifting region or in the step-variable shifting region. Thus, the switching control means 50 limits the electrically controlled differential function of the differential portion 11 by placing the differential portion 11 in the step-variable shifting state by controlling the switching clutch C0 and/or the switching brake B0. That is, the switching control means 50 functions as differential limiting means for limiting the operation of the differential portion 11 as the electrically controlled continuously variable transmission.

Described in detail, when the switching control means 50 determines that the vehicle condition is in the step-variable shifting region, the switching control means 50 disables the hybrid control means 52 to implement a hybrid control or continuously-variable shifting control, and enables the step-variable shifting control means 54 to implement a predetermined step-variable shifting control in which the transmission portion 20 is automatically shifted according to the shifting boundary line map stored in the memory means 56 and indicated in FIG. 6 by way of example. FIG. 2 indicates the combinations of the engaging actions of the hydraulically operated frictional coupling devices C0, C1, C2, B0, B1, B2 and B3, which are stored in the memory means 56 and which are selectively used for automatic shifting of the automatic transmission portion 20. In the step-variable shifting state, the transmission mechanism 10 as a whole constituted by the differential portion 11 and the automatic transmission portion 20 functions as a so-called step-variable automatic transmission which is automatically shifted according to the table of FIG. 2.

When the high-speed-gear determining means 62 has determined that the transmission mechanism 10 should be shifted to the fifth gear position, for example, the switching control means 50 commands the hydraulic control unit 42 to release the switching clutch C0 and engage the switching brake B0, for enabling the differential portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining means 62 has not determined that the transmission mechanism 10 should be shifted to the fifth gear position, the switching control means 50 commands the hydraulic control unit 42 to engage the switching clutch C0 and release the switching brake B0, for enabling the differential portion 11 to function as an auxiliary transmission having a fixed speed ratio γ0 of 1.0, for example, so that the transmission mechanism 10 as a whole is placed in a speed-reducing gear position having a speed ratio not lower than 1.0. Thus, when the transmission mechanism 10 is switched to the step-variable shifting state by the switching control means 50, the differential portion 11 operable as the auxiliary transmission is placed in a selected one of two gear positions under the control of the switching control means 50 while the automatic transmission portion 20 connected in series to the differential portion 11 functions as a step-variable transmission, so that the transmission mechanism 10 as a whole functions as the so-called step-variable automatic transmission.

When the switching control means 50 has determined that the vehicle condition is in the continuously-variable shifting region for placing the transmission mechanism 10 in the continuously-variable shifting state, on the other hand, the switching control means 50 commands the hydraulic control unit 42 to release both of the switching clutch C0 and brake B0, for placing the differential portion 11 in the continuously-variable shifting state. At the same time, the switching control means 50 enables the hybrid control means 52 to implement the hybrid control, and commands the step-variable shifting control means 54 to select and hold a predetermined one of the gear positions, or to permit the automatic transmission portion 20 to be automatically shifted according to the shifting boundary line map stored in the map memory 56 and indicated in FIG. 6 by way of example. In the latter case, the variable-step shifting control means 54 implements the automatic shifting control by suitably selecting the combinations of the operating states of the frictional coupling devices indicated in the table of FIG. 2, except the combinations including the engagement of the switching clutch C0 and brake B0. Thus, the differential portion 11 switched to the continuously-variable shifting state under the control of the switching control means 50 functions as the continuously variable transmission while the automatic transmission portion 20 connected in series to the differential portion 11 functions as the step-variable transmission, so that the transmission mechanism 10 provides a sufficient vehicle drive force, such that the input speed $N_{IN}$ of the automatic transmission portion 20 placed in one of the first through fourth gear positions, namely, the rotating speed $N_{18}$ of the power transmitting member 18 is continuously changed, so that the speed ratio of the transmission mechanism 10 when the transmission portion 20 is placed in one of those gear positions is continuously variable over a predetermined range. Accordingly, the speed ratio of the automatic transmission portion is continuously variable across the adjacent gear positions, whereby the total speed ratio γT of the transmission mechanism 10 is continuously variable.

The maps of FIG. 6 will be described in detail. The shifting boundary line map (shifting control map or relation) shown in FIG. 6 by way of example and stored in the memory means 56 is used for determining whether the automatic transmission portion 20 should be shifted, and is defined in a two-dimensional coordinate system by control parameters consisting of the vehicle speed V and the drive-force-related value in the form of the required output torque $T_{OUT}$. In FIG. 6, the solid lines indicate the shift-up boundary lines, while the one-dot chain lines indicate the shift-down boundary lines.

The broken lines in FIG. 6 represent the upper vehicle-speed limit V1 and the upper output-torque limit T1 which are used for the switching control means 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the automatic transmission portion 20 above which it is determined that the hybrid vehicle is in a high output running state. The output torque $T_{OUT}$ is an example of the drive-force-related value which relates to the drive force of the hybrid vehicle. FIG. 6 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 6 constitute the stored switching boundary line map (switching control map or relation) used by the switching control means 50 to determine whether the vehicle condition is in the step-variable shifting region or the continuously-variable shifting region, depending upon whether the control parameters in the form of the vehicle speed V and the output torque $T_{OUT}$ are higher than the pre-determined upper limit values V1, T1. This switching boundary line map may be stored in the memory means 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control means 50 switches the transmission mechanism 10 in the step-variable shifting state by engaging the switching brake B0, when the actual vehicle speed V has exceeded the upper limit V1, or by engaging the switching clutch C0, when the output torque $T_{OUT}$ of the automatic transmission portion 20 has exceeded the upper limit T1.

The switching control means 50 may be arranged to place the transmission mechanism 10 in the step-variable shifting state even when the vehicle condition is in the continuously-variable shifting region, upon detection of any functional failure or deterioration of the electric components such as the electric motors which are operable to operate the differential portion 11 as the electrically controlled continuously variable transmission. Those electric components include components such as the first electric motor M1, second electric motor M2, inverter 58, electric-energy storage device 60 and electric lines interconnecting those lines, which define upper limit of the vehicle speed V or engine output.

The drive-force-related value indicated above is a parameter corresponding to the drive force of the vehicle, which may be the output torque $T_{OUT}$ of the automatic transmission portion 20, the engine output torque $T_E$ or an acceleration value G of the vehicle, as well as a drive torque or drive force of drive wheels 38. The parameter may be: an actual value calculated on the basis of the angle of operation $A_{CC}$ of the accelerator pedal 45 or the opening angle of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission portion 20 and required vehicle drive force, which are calculated on the basis of the angle of operation $A_{CC}$ of the accelerator pedal 45 or the opening angle of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined so that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. On the other hand, the upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 8:
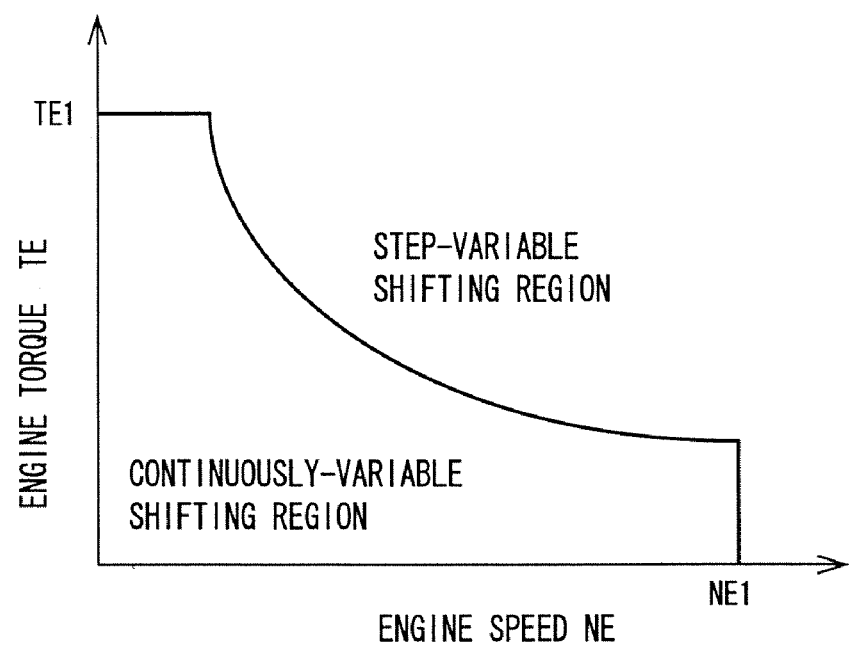
FIG. 8 is a view illustrating a stored relationship defining boundary lines between a continuously-variable shifting region and a step-variable shifting region, which relationship is used to map boundary lines defining the continuously-variable and step-variable shifting regions which are indicated by broken lines in FIG. 6.

Referring to FIG. 8, there is shown a switching boundary line map (switching control map or relation) which is stored in the memory means 56 and which defines engine-output lines serving as boundary lines used by the switching control means 50 to determine whether the vehicle condition is in the step-variable or continuously-variable shifting region. These engine-output lines are defined by control parameters in the form of the engine speed $N_E$ and the engine torque $N_T$. The switching control means 50 may use the switching boundary line map of FIG. 8 in place of the switching boundary line map of FIG. 6, to determine whether the vehicle condition is in the continuously-variable or step-variable shifting region, on the basis of the engine speed $N_E$ and engine torque $T_E$. The switching boundary line map of FIG. 6 may be based on the switching boundary line map of FIG. 8. In other words, the broken lines in FIG. 6 may be determined on the basis of the relation (map) of FIG. 8, in the two-dimensional coordinate system defined by the control parameters in the for of the vehicle speed V and the output torque $T_{OUT}$.

The step-variable shifting region defined by the switching boundary line map of FIG. 6 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 8 is defined as a high-torque drive region in which the engine torque $T_E$ is not lower than the predetermined upper limit TE1, or a high-speed drive region in which the engine speed $N_E$ is not lower than the predetermined upper limit NE1, or alternatively defined as a high-output drive region in which the output of the engine 8 calculated on the basis of the engine torque $N_T$ and speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $T_E$, speed $N_E$ or output of the engine 8 is comparatively low, that is, when the engine 8 is in the normal output state. The boundary lines of the switching boundary switching map of FIG. 8 may be considered as high-speed threshold lines or high-engine-output threshold lines, which define upper limit of the vehicle speed V or engine output.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the differential portion 11 functions as the electrically controlled continuously variable transmission.

In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors.

Namely, the upper limit TE1 is determined such that the first electric motor M1 can withstand the reaction torque when the engine output $T_E$ is not higher than the upper limit TE1, and the differential portion 11 is placed in the step-variable shifting state when the vehicle is in the high-output running state in which the engine torque $T_E$ is higher than the upper limit TE1 In the step-variable shifting state of the differential portion 11, therefore, the first electric motor M1 need not withstand the reaction torque with respect to the engine torque $T_E$ as in the continuously-variable shifting state of the differential portion 11, making it possible to reduce deterioration of durability of the first electric motor M1 while preventing an increase of its required size. In other words, the required maximum output of the first electric motor M1 in the present embodiment can be made smaller than its reaction torque capacity corresponding to the maximum value of the engine output $T_E$. That is, the required maximum output of the first electric motor M1 can be determined such that its reaction torque capacity is smaller than a value corresponding to the engine torque $T_E$ exceeding the upper limit TE1, so that the first electric motor M1 can be small-sized.

The maximum output of the first electric motor M1 is a nominal rating of this motor which is determined by experimentation in the environment in which the motor is operated. The above-described upper limit of the engine torque $T_E$ is determined by experimentation such that the upper limit is a value which is equal to or lower than the maximum value of the engine torque $T_E$, and below which the first electric motor M1 can withstand the reaction torque, so that the deterioration of durability of the first electric motor M1 can be reduced.

Figure 9:
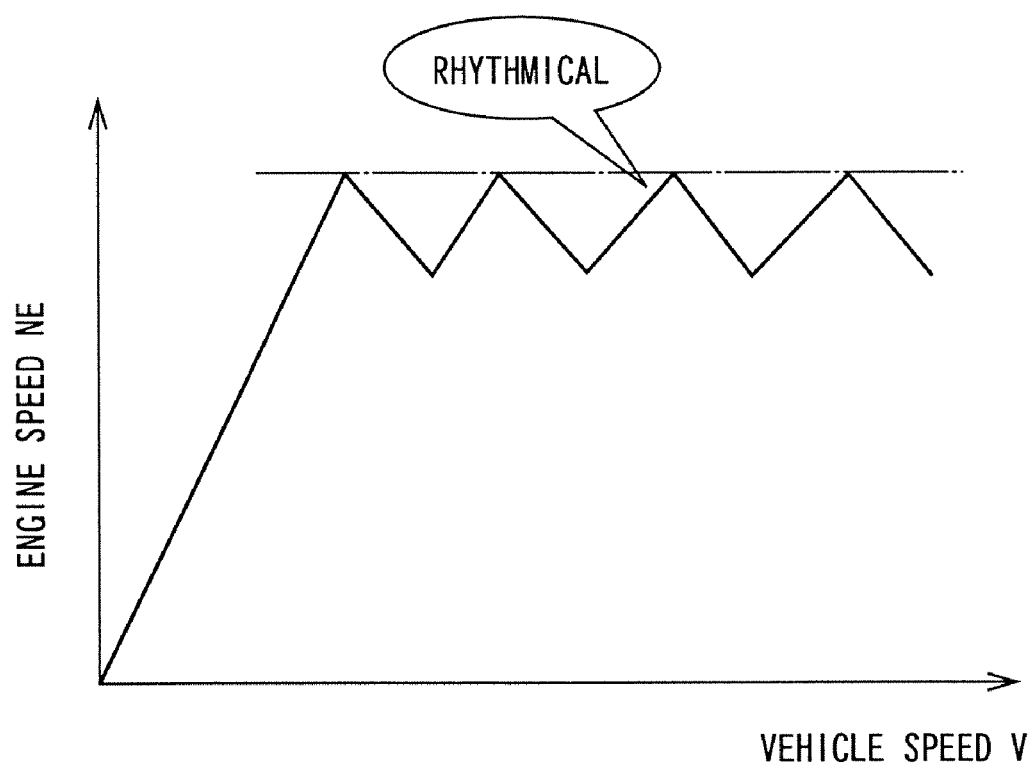
FIG. 9 is a view indicating an example of a change of the engine speed as a result of a shift-up action of the step-variable transmission.

According to the other concept, the transmission mechanism 10 is placed in the step-variable shifting state (fixed-speed-ratio shifting state), rather than in the continuously-variable shifting state, in the high-output running state of the vehicle in which the vehicle operator has a stronger desire for improved drivability of the vehicle rather than improved fuel economy. In this case, the engine speed $N_E$ changes with a shift-up action of the automatic transmission portion 20, assuring a comfortable rhythmic change of the engine speed $N_E$ as the transmission portion 20 is shifted up, as indicated in FIG. 9.

Figure 10:
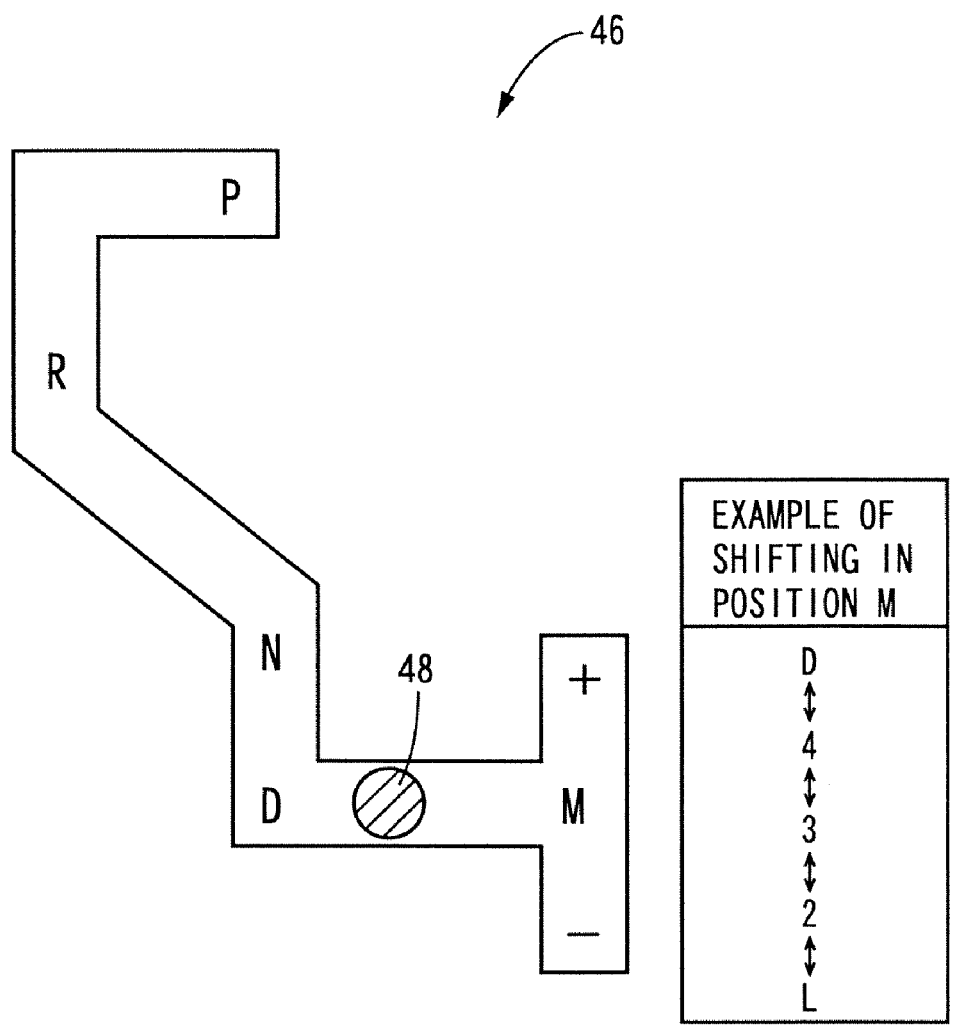
FIG. 10 is a view showing an example of a manually operated shifting device including a shift lever and operable to select one of a plurality of shift positions.

FIG. 10 shows an example of a manually operable shifting device in the form of a shifting device 46. The shifting device 46 includes the above-described shift lever 48, which is disposed laterally adjacent to an operator's seat, for example, and which is manually operated to select one of a plurality of positions consisting of: a parking position P for placing the drive system 10 (namely, automatic transmission portion 20) in a neutral state in which a power transmitting path is disconnected with both of the switching clutch C0 and brake B0 placed in the released state, and at the same time the output shaft 22 of the automatic transmission portion 20 is in the locked state; a reverse-drive position R for driving the vehicle in the rearward direction; a neutral position N for placing the drive system 10 in the neutral state; an automatic forward-drive shifting position D; and a manual forward-drive shifting position M.

When the shift lever 48 is operated to a selected one of the shift positions, a manual valve incorporated in the hydraulic control unit 42 and operatively connected to the shift lever 48 is operated to establish the corresponding state of the hydraulic control unit 42. In the automatic forward-drive position D or the manual forward-drive position M, one of the first through fifth gear positions ($1^{st}$ through $5^{th}$) indicated in the table of FIG. 2 is established by electrically controlling the appropriate solenoid-operated valves incorporated in the hydraulic control unit 42.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the clutches C1 and C2, as shown in the table of FIG. 2. In the drive positions R, D, M, the power transmitting path in the automatic transmission portion 20 is in the power-transmitting state established by engaging the first clutch C1 and/or the second clutch C2, as also shown in the table of FIG. 2.

Described in detail, a manual operation of the shift lever 48 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 48 from the neutral position N to the automatic forward-drive position D causes at least the first clutch C1 to be engaged for switching the power transmitting path in the automatic transmission portion 20 from the power-cut-off state to the power-transmitting state. The automatic forward-drive position D provides a highest-speed position, and positions "4" through "L" selectable in the manual forward-drive position M are engine-braking positions in which an engine brake is applied to the vehicle.

The manual forward-drive position M is located at the same position as the automatic forward-drive position D in the longitudinal direction of the vehicle, and is spaced from or adjacent to the automatic forward-drive position D in the lateral direction of the vehicle. The shift lever 48 is operated to the manual forward-drive position M, for manually selecting one of the above-indicated positions "D" through "L". Described in detail, the shift lever 48 is movable from the manual forward-drive position M to a shift-up position "+" and a shift-down position "−", which are spaced from each other in the longitudinal direction of the vehicle. Each time the shift lever 48 is moved to the shift-up position "+" or the shift-down position "−", the presently selected position is changed by one position. The five positions "D" through "L" have respective different lower limits of a range in which the overall speed ratio γT of the transmission mechanism 10 is automatically variable, that is, respective different lowest values of the overall speed ratio γT which corresponds to the highest output speed of the transmission mechanism 10. Namely, the five positions "D" through "L" select respective different numbers of the speed positions (gear positions) of the automatic transmission portion 20 which are automatically selectable, so that the lowest overall speed ratio γT available is determined by the selected number of the gear positions. The shift lever 48 is biased by biasing means such as a spring so that the shift lever 48 is automatically returned from the shift-up position "+" and shift-down position "−" back to the manual forward-drive position M. The shifting device 46 is provided with a shift-position sensor 49 operable to detect the presently selected position of the shift lever 48, so that signals indicative of the presently selected operating position of the shift lever 48 and the number of shifting operations of the shift lever 48 in the manual forward-shifting position M are applied to the electronic control device 40.

When the shift lever 48 is operated to the automatic forward-drive position D, the switching control means 50 effects an automatic switching control of the transmission mechanism 10 according to the stored switching boundary line map indicated in FIG. 6, and the hybrid control means 52 effects the continuously-variable shifting control of the power distributing mechanism 16, while the step-variable shifting control means 54 effects an automatic shifting control of the automatic transmission 20. When the transmission mechanism 10 is placed in the step-variable shifting state, for example, the shifting action of the transmission mechanism 10 is automatically controlled to select an appropriate one of the first through the fifth gear position indicated in FIG. 2. When the drive system is placed in the continuously-variable shifting state, the speed ratio of the power distributing mechanism 16 is continuously changed, while the shifting action of the automatic transmission 20 is automatically controlled to select an appropriate one of the first through fourth gear positions, so that the overall speed ratio γT of the transmission mechanism 10 is controlled so as to be continuously variable within the predetermined range. The automatic forward-drive position D is a position selected to establish an automatic shifting mode (automatic mode) in which the transmission mechanism 10 is automatically shifted.

When the shift lever 48 is operated to the manual forward-drive position M, on the other hand, the shifting action of the transmission mechanism 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the shift positions. When the transmission mechanism 10 is placed in the step-variable shifting state, for example, the shifting action of the transmission mechanism 10 is automatically controlled within the above-indicated predetermined range of the overall speed ratio γT. When the transmission mechanism 10 is placed in the step-variable shifting state, the speed ratio of the power distributing mechanism 16 is continuously changed, while the shifting action of the automatic transmission 20 is automatically controlled to select an appropriate one of the gear positions the number of which is determined by the manually selected one of the shift positions, so that the overall speed ratio γT of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

As described above, the transmission mechanism 10 in the present embodiment is provided with the automatic transmission portion 20 in addition to the differential portion 11, and the automatic transmission portion 20 performs a clutch-to-clutch shifting action under the control of the step-variable shifting control means 54, on the basis of the running state of the vehicle and according to the shifting boundary line map shown in FIG. 6 by way of example. Where the shifting action of the automatic transmission portion 20 is performed, the input speed $N_{IN}$ of the automatic transmission portion 20 changes in the process of the shifting action, if the vehicle speed V is held constant during the shifting action.

Described in detail, the step-variable shifting control means 54 includes racing-amount control means 80 for changing an amount F of a racing rise (hereinafter referred to as "racing amount F") of the input speed $N_{IN}$ of the automatic transmission portion 20 during each clutch-to-clutch shifting action of the automatic transmission portion 20, so that the clutch-to-clutch shifting action is controlled such that the input speed $N_{IN}$ of the automatic transmission portion 20 changes in a predetermined manner suitable for reducing a shifting shock. The racing amount F corresponds to an amount of overlapping of the engaging torque of the coupling device in the releasing action and the engaging torque of the coupling device in the engaging action. The racing amount F decreases with an increase of the amount of overlapping, and conversely increases with a decrease of the amount of overlapping.

For example, the above-described predetermined manner of changing of the input speed $N_{IN}$ of the automatic transmission portion 20 is a predetermined rate of change $N_{IN}'$ ($=dN_{IN}/dt$) of the input speed $N_{IN}$ during the shifting action of the automatic transmission portion 20, which predetermined rate of change $N_{IN}'$ is obtained by experimentation to establish an ideal value of the input speed $N_{IN}$ which is determined by the vehicle running speed V and the speed ratio γ of the automatic transmission portion 20, for instance, to provide a best compromise between a high shifting response with a relatively high value of the rate of change $N_{IN}'$ to be felt comfortable by the vehicle operator, and a low shifting response with a relatively low value of the rate of change $N_{IN}'$ tending to permit easy reduction of the shifting shock, namely, to provide a best compromise between the shortening of the required shifting time and the reduction of the shifting shock.

The racing-amount control means 80 is configured to control a hydraulic control command (a shifting command) to be applied from the step-variable shifting control means 54 to the hydraulic control unit 42, for controlling the engaging pressures and the timings of the releasing and engaging actions of the coupling devices to be released and engaged for performing the clutch-to-clutch shifting action of the automatic transmission portion 20, so that the input speed $N_{IN}$ of the automatic transmission portion 20 changes in the predetermined manner during the shifting action.

Described in detail, the racing-amount control means 80 is arranged to implement a learning control of the engaging pressures of the coupling devices in the releasing and engaging actions, which engaging pressures are to be used for the next occurrence of the clutch-to-clutch shifting action of the automatic transmission portion 20. The learning control is implemented on the basis of the racing amount F of the input speed $N_{IN}$ of the automatic transmission portion 20 at the beginning of the inertia phase of the clutch-to-clutch shifting action under the control of the step-variable shifting control means 54. The racing-amount control means 80 updates stored learning control maps each of which represents a relationship between the engaging pressures of the two coupling devices, and the engine torque $T_E$ and vehicle running speed V. The racing-amount control means 80 updates one of the stored learning control maps which corresponds to the engine torque $T_E$ and vehicle running speed V during the clutch-to-clutch shifting action in question. The updated learning control map is used for the next occurrence of this clutch-to-clutch shifting action.

The racing amount F is defined as a maximum value $\Delta N_{INMAX}$ of a difference $\Delta N_{IN}$ ($=N_{INR}-N_{INC}$) between an actual value $N_{INR}$ and a calculated value $N_{INC}$ of the input speed $N_{IN}$ of the automatic transmission portion 20. Alternatively, the racing amount F is defined as a time $t_F$ from a moment of generation of the difference $\Delta N_{IN}$ to a moment at which the difference $\Delta N_{IN}$ is substantially zeroed. The time $t_F$ may be used in addition to the maximum value $\Delta N_{INMAX}$, for the definition of the racing amount F.

For instance, the racing-amount control means 80 is configured to calculate the difference $\Delta N_{IN}$ between the actual value $N_{INR}$ of the input speed $N_{IN}$ of the automatic transmission portion 20, and the calculated value $N_{INC}$ ($=\gamma \times N_{OUT}$) of the input speed $N_{IN}$ obtained from the actual output shaft speed $N_{OUT}$ and the speed ratio γ of the automatic transmission portion 20, and determines the maximum value $\gamma N_{INMAX}$ of calculated difference $\Delta N_{IN}$, as the racing amount F of the input speed $N_{IN}$. The racing-amount control means 80 is arranged to determine, as the maximum value $\Delta N_{INMAX}$, one of the difference values $\Delta N_{IN}(n)$ calculated from time to time, which one is obtained when inequalities $\Delta N_{IN}(n-1)<\Delta N_{IN}(n)$, and $\Delta N_{IN}(n)<\Delta N_{IN}(n+1)$ are satisfied.

Thus, the racing-amount control means 80 adjusts the amount of overlapping of the engaging pressures of the two coupling devices in the releasing and engaging actions during the clutch-to-clutch shifting action of the automatic transmission portion 20, by controlling or changing the engaging pressures of the coupling devices and the timings of the releasing and engaging actions, on the basis of the determined racing amount F of the input speed $N_{IN}$.

When the racing mount F of the input speed $N_{IN}$ during the clutch-to-clutch shifting action is larger than a predetermined threshold, for example, that is, when the clutch-to-clutch shifting action is effected in an insufficient-overlapping state with a relatively small amount of overlapping of the engaging pressures of the coupling devices in the releasing and engaging actions, the racing-amount control means 80 increases one or both of the engaging pressures of the two coupling device to be released and engaged for the next occurrence of the same clutch-to-clutch shifting action, for increasing the amount of overlapping of the engaging pressures of the two coupling devices, to establish a tie-up state of the coupling devices, for thereby suitably reducing the racing amount F during the next clutch-to-clutch shifting action.

When the racing amount F of the input speed $N_{IN}$ during the clutch-to-clutch shifting action is smaller than the predetermined threshold, that is, when the clutch-to-clutch shifting action is effected in an excessive-overlapping state (tie-up state) with a relatively large amount of overlapping of the engaging pressures of the coupling devices in the releasing and engaging actions, the racing-amount control means 80 reduces one or both of the engaging pressures of the two coupling devices for the next occurrence of the same clutch-to-clutch shifting action, for reducing the amount of overlapping of the engaging pressures of the coupling devices, for thereby suitably increasing the racing amount F during the next clutch-to-clutch shifting action. The above-indicated predetermined threshold is a desired value of the racing amount F which is obtained by experimentation to reduce the shifting shock and improve the shifting action as felt by the vehicle operator.

As described above, the racing-amount control means 80 is configured to implement the learning control of one or both of the engaging pressures of the two coupling devices to be released and engaged for the clutch-to-clutch shifting action of the automatic transmission portion 20, so as to reduce the shifting shock and improve the shifting action as felt by the vehicle operator. Accordingly, the clutch-to-clutch shifting action is controlled such that the input speed $N_{IN}$ of the automatic transmission portion 20 has a suitable racing rise (hereinafter referred to as "a racing") at the beginning of the inertia phase of the clutch-to-clutch shifting action, with the amount of overlapping of the engaging pressures being suitably restricted. The racing amount is determined on the basis of the maximum value $\Delta N_{INMAX}$ of the difference $\Delta N_{IN}$, or depending upon whether the difference $\Delta N_{IN}$ is larger than the predetermined threshold or not. That is, the step-variable shifting control means 54 controls the clutch-to-clutch shifting action of the automatic transmission portion 20, so as to be performed with a suitable amount of racing of the input speed $N_{IN}$, which is established by the racing-amount control means 80 with the learning control of one or both of the engaging pressures of the coupling devices to be released and engaged for the next shifting action.

It is noted in this connection that the transmission mechanism 10 (differential portion 11 or power distributing mechanism 16) according to the present embodiment is selectively switchable to the continuously-variable shifting state (differential state), and the non-continuously-variable shifting state, for instance, the step-variable shifting state (e.g., locked state), under the control of the switching control means 50, which determines the shifting state of the differential portion 11 on the basis of the vehicle condition and places the differential portion 11 in a selected one of the continuously-variable and step-variable shifting states.

The hybrid control means 52 controls the shifting action of the differential portion 11 placed in its continuously-variable shifting state, that is, controls the electric CVT function (differential operation) of the differential portion 11, in synchronization with the clutch-to-clutch shifting action of the automatic transmission portion 20, so as to restrict a change of the engine speed $N_E$ in the process of the shifting action of the automatic transmission portion 20, for example, so as to hold the engine speed $N_E$ substantially constant, irrespective of a change of the input speed $N_{IN}$ due to the shifting action.

During the shifting action of the automatic transmission portion 20 while the differential portion 11 is placed in its non-continuously-variable shifting state, the speed ratio γ0 of the differential portion 11 is held constant, like the speed ratio γ of the automatic transmission portion 20, so that the engine speed $N_E$ as well as the transmitting-member speed $N_{18}$ is determined by the vehicle running speed V and the speed ratio γ of the automatic transmission portion 20. Namely, the hybrid control means 52 changes the speed ratio of the differential portion 11 in the continuously-variable shifting state, but does not change the speed ratio in the non-continuously-variable shifting state.

Accordingly, the racing of the input speed $N_{IN}$ of the automatic transmission portion 20 during the clutch-to-clutch shifting action effected according to the learning control of one or both of the engaging pressures of the coupling devices in the releasing and engaging actions by the racing-amount control means 80 does not cause a problem when the clutch-to-clutch shifting action takes place in the non-continuously-variable shifting state of the differential portion 11. When the clutch-to-clutch shifting action takes place in the continuously-variable shifting state of the differential portion 11, on the other hand, the shifting action of the differential portion 11 must be controlled by the hybrid control means 52 in synchronization with the shifting action, so as to restrict the change of the engine speed $N_E$, so that this synchronous control of the shifting action of the differential portion 11 would tend to be deteriorated, giving rise to a risk of generation of a relatively serious shifting shock, if the clutch-to-clutch shifting action of the automatic transmission portion 20 were conventionally controlled. Namely, the racing of the input speed $N_{IN}$ at the beginning of the inertia phase of the clutch-to-clutch shifting action of the automatic transmission portion 20 in the continuously-variable shifting state of the differential portion 11 would make it difficult to accurately determine the moment of initiation of the synchronous control of the shifting action of the differential portion 11 in synchronization with the clutch-to-clutch shifting action, or to hold the engine speed $N_E$ substantially constant, so that the considerably shifting shock would occur. Therefore, it is required to prevent or minimize the amount of racing of the input speed $N_{IN}$ during the clutch-to-clutch shifting action of the automatic transmission portion 20 while the differential portion 11 is placed in the continuously-variable shifting state.

In view of the above-indicated drawback, the step-variable shifting control means 54 is configured to change the racing amount F of the input speed $N_{IN}$ of the automatic transmission portion 20 during its clutch-to-clutch shifting action, depending upon whether the differential function (operation as the electrically controlled continuously variable transmission) of the differential portion 11 is limited by the differential-state limiting device (switching clutch C0 or switching brake B0), for example, depending upon whether the differential portion 11 is placed in its continuously-variable shifting state or its non-continuously-variable shifting state. There will be described in detail the operation to change the racing amount F during the clutch-to-clutch shifting action of the automatic transmission portion 20.

The racing-amount control means 80 determines one or both of the engaging pressures of the coupling devices in the releasing and engaging actions for the clutch-to-clutch shifting action of the automatic transmission portion 20 such that the engaging pressure or pressures is/are higher in the continuously-variable shifting state of the differential portion 11, than in the non-continuously-variable shifting state, to reduce the racing amount F of the input speed $N_{IN}$ during the clutch-to-clutch shifting action of the automatic transmission portion 20, in other words, to increase the amount of overlapping of the engaging pressures of the two coupling devices.

For example, the racing-amount control means 80 determines one or both of the engaging pressures to be released and engaged for the clutch-to-clutch shifting action of the automatic transmission portion 20, so as to implement the tie-up control, that is, the overlap control for increasing the amount of overlapping of the engaging pressures of the two coupling devices, for thereby preventing the racing of the input speed $N_{IN}$ at the beginning of the inertia phase of the clutch-to-clutch shifting action of the automatic transmission portion 20, where the clutch-to-clutch shifting action takes place while the differential portion 11 is placed in its continuously-variable shifting state.

Where the clutch-to-clutch shifting action of the automatic transmission portion 20 takes place while the differential portion 11 is placed in its non-continuously-variable shifting state, the racing-amount control means 80 implements the learning control of one or both of the engaging pressures of the coupling devices to be released and engaged for the clutch-to-clutch shifting action, namely, implements the overlap reducing control for racing of the input speed $N_{IN}$ at the beginning of the inertia phase of the clutch-to-clutch shifting action.

Where the clutch-to-clutch shifting action of the automatic transmission portion 20 in the continuously-variable shifting state of the differential portion 11 is effected in the tie-up state of the coupling devices, the racing of the input speed $N_{IN}$ is restricted, so that the learning control by the racing-amount control means 80 is not implemented, whereby the degree of the tie-up would be increased in the continuously-variable shifting state of the differential portion 11, giving rise to a risk of considerable reduction of the output torque $T_{OUT}$ and consequent generation of a considerable shifting shock.

In view of the above-described risk, the racing-amount control means 80 is configured to determine one or both of the engaging pressures of the two coupling devices to be released and engaged for the clutch-to-clutch shifting action of the automatic transmission portion 20 in the continuously-variable shifting state of the differential portion 11, so as to effect the clutch-to-clutch shifting action in a light tie-up state in the continuously-variable shifting state of the differential portion 11, on the basis of the engaging pressure or pressures of one or both of the two coupling devices which has/have been updated by the learning control in the non-continuously-variable shifting state of the differential portion 11.

Described in detail, the racing-amount control means 80 determines one or both of the engaging pressures of the coupling devices to be released and engaged for the clutch-to-clutch shifting action in the continuously-variable shifting state of the differential portion 11, for increasing the degree of the tie-up of the coupling devices, such that the engaging pressure used in the continuously-variable shifting state is made higher by a predetermined amount obtained by experimentation, than the engaging pressure which has been updated by the learning control for racing of the input speed in the non-continuously-variable shifting state. The engaging pressure updated by the learning control for racing of the input speed is obtained from one of the learning control maps, which one map corresponds to the engine torque $T_E$ and vehicle speed V closest to those during the clutch-to-clutch shifting action in question in the continuously-variable shifting state.

In the continuously-variable shifting state of the differential portion 11, the racing-amount control means 80 of the step-variable shifting control means 54 determines the engaging pressure or pressures of one or both of the two coupling devices, to be higher than that or those in the non-continuously-variable shifting state, for increasing the amount of overlapping of the engaging pressures, that is, for effecting the clutch-to-clutch shifting action in the light tie-up state. In the non-continuously-variable shifting state of the differential portion 11, the step-variable shifting control means 54 controls the clutch-to-clutch shifting action in the racing state of the input speed $N_{IN}$, with the engaging pressure or pressures of one or both of the two coupling devices, which has/have been updated by the learning control by the racing-amount control means 80.

Shifting-action determining means 82 is provided to determine whether the automatic transmission portion 20 has been commanded to perform a shifting action. For instance, this determination is made depending upon the step-variable shifting control means 54 has determined to effect a clutch-to-clutch shifting action of the automatic transmission portion 20 to a gear position determined on the basis of the vehicle condition and according to the shifting boundary line map shown in FIG. 6, and has applied the shifting command to the hydraulic control unit 42 to release and engage the appropriate two coupling devices for effecting the clutch-to-clutch shifting action.

Locked-state determining means 84 is provided to determine whether the power distributing mechanism 16 is placed in the non-differential state (locked state), that is, whether the differential portion 11 is placed in the non-continuously-variable shifting state (locked state). This determination is made for determining whether the racing amount F should be changed by the racing-amount control means 80 during the clutch-to-clutch shifting action of the automatic transmission portion 20 under the control of the step-variable shifting control means 54. The locked-state determining means 84 is operated when the shifting-action determining means 82 has determined that the automatic transmission portion 20 has been commanded to perform the shifting action. For instance, the locked-state determining means 84 is configured to make the determination as to whether the differential portion 11 is placed in the non-continuously-variable shifting state, depending upon whether the switching control means 50 has determined that the vehicle condition represented by the vehicle speed V and the output torque $T_{OUT}$ lies in the step-variable shifting region for placing the transmission mechanism 10 in the step-variable shifting state, or in the continuously-variable shifting region for placing the transmission mechanism 10 in the continuously-variable shifting state. This determination by the switching control means 50 is made on the basis of the vehicle speed V and output torque $T_{OUT}$ and according to the switching boundary line map shown in FIG. 6 by way of example.

The hybrid control means 52 may be further arranged to positively change the input speed $N_{IN}$ as desired by controlling the first electric motor M1 and/or the second electric motor M2, in the inertia phase of the shifting action of the automatic transmission portion 20 performed under the control of the step-variable shifting control means 54, if the locked-state determining means 84 has determined that the differential portion 11 is placed in the continuously-variable shifting state.

Alternatively, the hybrid control means 52 may be arranged to positively change the input speed $N_{IN}$ or the engine speed $N_E$ as desired by controlling the first electric motor M1 and/or the second electric motor M2, in the inertia phase of the shifting action of the automatic transmission portion 20 performed under the control of the step-variable shifting control means 54, if the locked-state determining means 84 has determined that the differential portion 11 is placed in the non-continuously-variable shifting state.

The arrangement described above permits a better change of the input speed $N_{IN}$ and the engine speed $N_E$ (only in the non-continuously-variable shifting state of the differential portion 11) in the predetermined manner, than an arrangement in which the input speed $N_{IN}$ and the engine speed $N_E$ (only in the non-continuously-variable shifting state of the differential portion 11) change primarily due to the shifting action of the automatic transmission portion 20 effected by the releasing and engaging actions of the two coupling devices.

The input speed $N_{IN}$ and the engine speed $N_E$ (only in the non-continuously-variable shifting state of the differential portion 11) change primarily due to the shifting action of the automatic transmission portion 20 effected by the releasing and engaging actions of the two coupling devices, for example, when the engaging pressures of the coupling devices in the releasing and engaging actions for effecting the shifting action of the automatic transmission portion 20 are determined by the racing-amount control means 80 so as to change the input speed $N_{IN}$ or the engine speed $N_E$ (only in the non-continuously-variable shifting state of the differential portion 11) in the predetermined manner.

Like the predetermined manner of change of the input speed $N_{IN}$ of the automatic transmission portion 20, the predetermined manner of change of the engine speed $N_E$ is a predetermined rate of change $N_E'$ ($=dN_E/dt$) of the engine speed $N_E$ during the shifting action of the automatic transmission portion 20, which predetermined rate of change $N_E'$ is obtained by experimentation to establish an ideal value of the engine speed $N_E$ which is determined by the vehicle running speed V and the speed ratio $\gamma$ of the automatic transmission portion 20 in the non-continuously-variable shifting state of the differential portion 11, for instance, to provide a best compromise between a high shifting response with a relatively high value of the rate of change $N_E'$ to be felt comfortable by the vehicle operator, and a low shifting response with a relatively low value of the rate of change $N_E'$ tending to permit easy reduction of the shifting shock, namely, to provide a best compromise between the shortening of the required shifting time and the reduction of the shifting shock.

Figure 11:
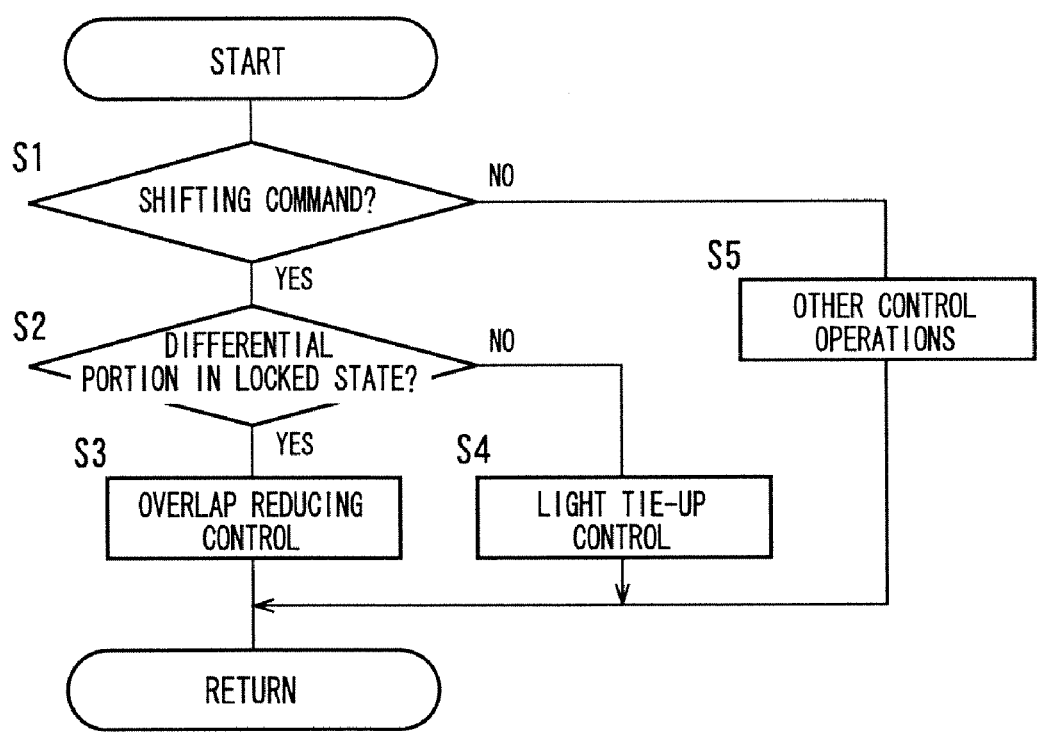
FIG. 11 is a flow chart illustrating a control operation of the electronic control device of FIG. 4, that is, a control routine to change an amount of engine racing during a clutch-to-clutch shifting action of the automatic transmission portion.

FIG. 11 is a flow chart for explaining a major control operation of the electronic control device 40, that is, a control routine to change the racing amount during a clutch-to-clutch shifting action of the automatic transmission portion 20. This control routine is repeatedly executed with an extremely short cycle time of about several milliseconds to several tens of milliseconds, for example.

Figure 12:
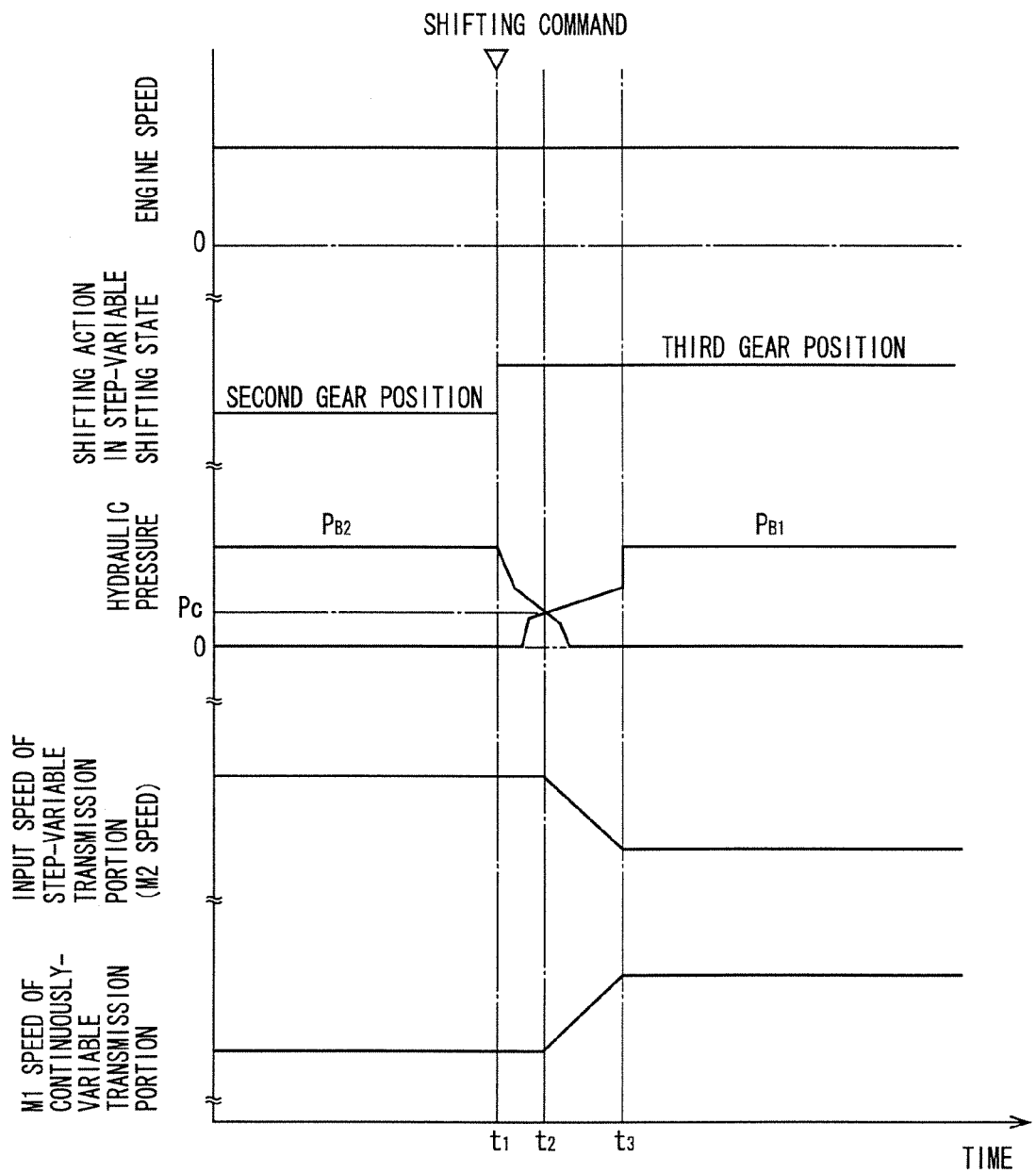
FIG. 12 is a time chart for explaining the control operation illustrated in the flow chart of FIG. 11, when the automatic transmission portion is commanded to effect a shift-up action from a second gear position to a third gear position, in the continuously-variable shifting state of the differential portion.

FIG. 12 is a time chart for explaining the control operation illustrated in the flow chart of FIG. 11, when the automatic transmission portion 20 is commanded to effect a shift-up action from the second gear position to the third gear position, in the continuously-variable shifting state of the differential portion 11.

Figure 13:
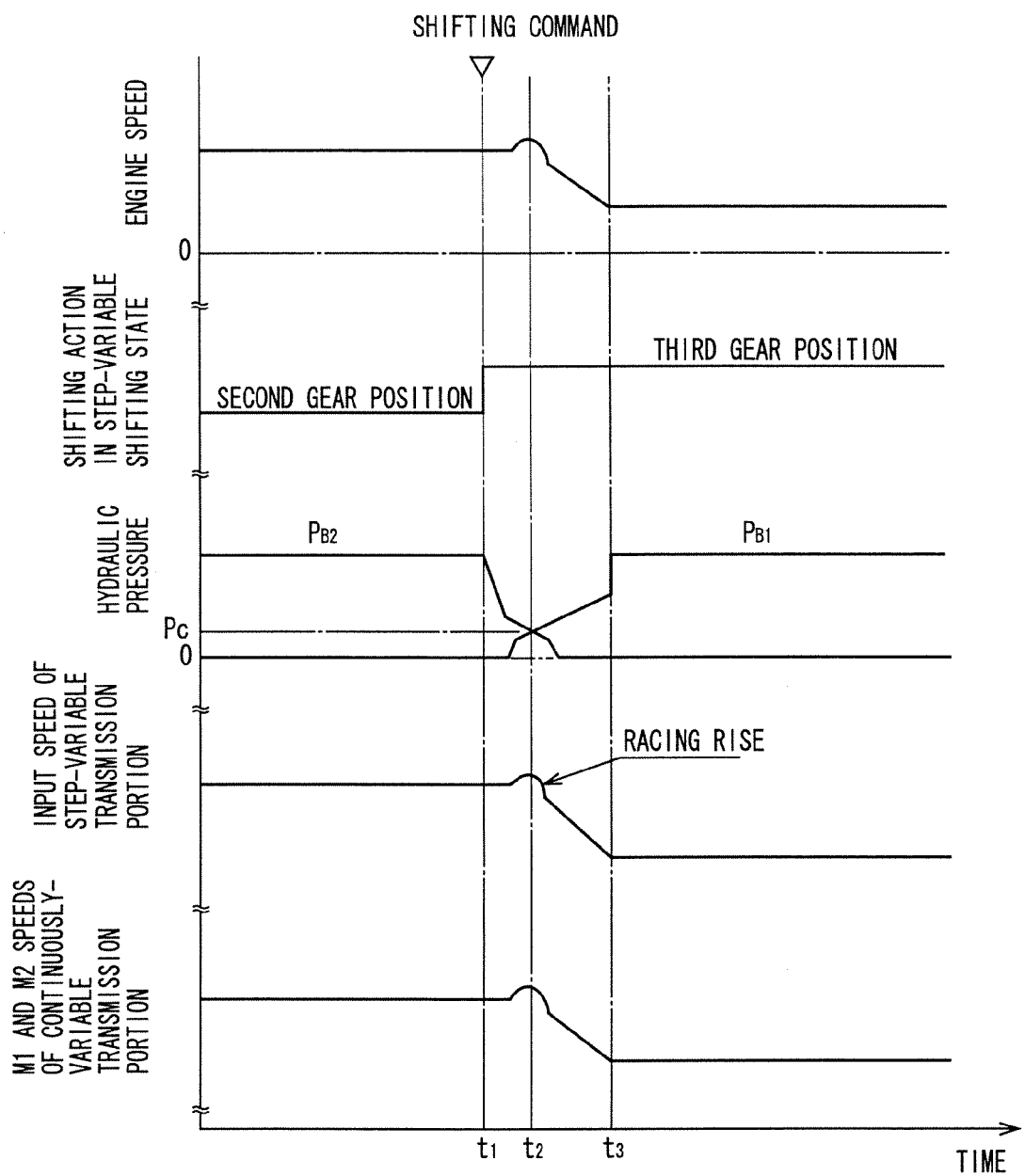
FIG. 13 is a time chart for explaining the control operation illustrated in the flow chart of FIG. 11, when the automatic transmission portion is commanded to effect the shift-up action from the second gear position to the third gear position, in the locked state (step-variable shifting state) of the differential portion.

FIG. 13 is a time chart for explaining the control operation illustrated in the flow chart of FIG. 11, when the automatic transmission portion 20 is commanded to effect the shift-up action from the second gear position to the third gear position, in the locked state (step-variable shifting state) of the differential portion 11.

The control routine is initiated with step S1 ("step" being hereinafter omitted) corresponding to the shifting-action determining means 82, to determine whether the automatic transmission portion 20 has been commanded to perform a shifting action. For example, this determination is made by determining whether the step-variable shifting control means 54 has generated a shifting command to be applied to the hydraulic control unit 42 for performing a clutch-to-clutch shifting action of the automatic transmission portion 20 to the gear position determined on the basis of the vehicle condition and according to the shifting boundary line map shown in FIG. 6.

In the example of FIG. 12, the shifting command for shifting up the automatic transmission portion (step-variable transmission portion) 20 from the second gear position to the third gear position has been generated at a point of time t1, in the continuously-variable shifting state (differential state) of the differential portion (continuously-variable transmission portion) 11.

In the example of FIG. 13, the shifting command for shifting up the automatic transmission portion (step-variable transmission portion) 20 from the second gear position to the third gear position has been generated at a point of time t1, in the non-continuously-variable shifting state (locked state) of the differential portion (continuously-variable transmission portion) 11.

If an affirmative determination is obtained in S1, the control flow goes to S2 corresponding to the locked-state determining means 84, to determine whether the power distributing mechanism 16 is placed in the non-differential state (locked state), that is, whether the differential portion (continuously-variable transmission portion) 11 is placed in the non-continuously-variable shifting state (locked state). For example, this determination is made by determining whether the vehicle condition lies in the step-variable shifting region of the switching boundary map shown in FIG. 6, in which the transmission mechanism 10 should be placed in the non-continuously-variable shifting state.

If an affirmative determination is obtained in S2, the control flow goes to S3 corresponding to the racing-amount control means 80 and the step-variable shifting control means 54, in which the clutch-to-clutch shifting action of the automatic transmission portion 20 is effected in a racing state of the input speed $N_{IN}$, with the engaging pressure of the coupling device in the releasing action, and/or the engaging pressure of the coupling device in the engaging action, which engaging pressures have been updated by the learning control for racing of the input speed $N_{IN}$ during the clutch-to-clutch shifting action. Further, one or both of the engaging pressures of the coupling devices to be released and engaged for the next occurrence of the same clutch-to-clutch shifting action of the automatic transmission portion 20 in the non-continuously-variable shifting state of the differential portion 11 is/are updated on the basis of the racing amount F of the input speed $N_{IN}$ at the beginning of the inertia phase of the clutch-to-clutch shifting action. Namely, the engaging pressure of the stored learning control map corresponding to the engine torque $T_E$ and vehicle speed V during the shifting action in question is updated.

In the example of FIG. 13, the clutch-to-clutch shifting action of the automatic transmission portion 20 is initiated at the point of time t1, with a drop of a releasing hydraulic pressure $P_{B2}$ of the second brake B2 which is the coupling device to be released. During a time period from the point of time t1 to a point of time t3, an engaging hydraulic pressure $P_{B1}$ of the first brake B1 which is the coupling device to be engaged is raised. At the point of time t3, the engaging action of the first brake B1 is completed, and the shifting action is terminated. The releasing pressure $P_{B2}$ and the engaging pressure $P_{B1}$ are those obtained by the learning control for racing of the input speed $N_{IN}$ during the same clutch-to-clutch shifting action.

Accordingly, there arise at the point of time t2 a racing rise of the input speed $N_{IN}$ of the automatic transmission portion 20 and a racing rise of the engine speed $N_E$ at the beginning of the inertia phase of the shifting action. On the basis of the racing amount F, the engaging pressure or pressures of the appropriate learning control map is/are updated for use for the next occurrence of the same clutch-to-clutch shifting action in the non-continuously-variable shifting state of the differential portion 11. If the actual clutch-to-clutch shifting action is effected in an insufficient-overlapping state while the racing mount F of the input speed $N_{IN}$ during the clutch-to-clutch shifting action is larger than the predetermined threshold, for example, one or both of the engaging pressures of the two coupling device to be released and engaged for the next occurrence of the same clutch-to-clutch shifting action is/are increased for increasing the amount of overlapping of the engaging pressures of the two coupling devices to be released and engaged for the next occurrence of the clutch-to-clutch shifting action, to establish a tie-up state of the coupling devices, for thereby suitably reducing the racing amount F during the next clutch-to-clutch shifting action. For example, the releasing hydraulic pressure $P_{B2}$ and the engaging hydraulic pressure $P_{B1}$ of the stored learning control map corresponding to the engine torque $T_E$ and vehicle speed V during the shifting action in question are updated.

In the example of FIG. 13, the clutch-to-clutch shift-up action is effected in the locked state of the differential portion 11 with the switching clutch C0 placed in the engaged state, so that the transmission mechanism 10 as a whole functions as a step-variable transmission. Accordingly, if the vehicle speed V is held constant, the input speed $N_{IN}$ of the automatic transmission portion 20 is lowered in the process of the shift-up action, and the engine speed $N_E$, first electric motor speed $N_{M1}$ and second electric motor speed $N_{M2}$ are also lowered. In the inertia phase of the shifting action of the automatic transmission portion 20 during the time period from the point of time t2 to the point of time t3, the first electric motor M1 and/or the second electric motor M2 may be controlled to positively lower the input speed $N_{IN}$ and/or the engine speed $N_E$ in the process of the shifting action.

If a negative determination is obtained in S2, the control flow goes to S4 corresponding to the racing-amount control means 80, the step-variable shifting control means 54 and the hybrid control means 52, in which the clutch-to-clutch shifting action of the automatic transmission portion 20 is effected in the tie-up state, with the engaging pressure of the coupling device in the releasing action, and/or the engaging pressure of the coupling device in the engaging action, which engaging pressures have been determined so as to prevent the racing of the input speed $N_{IN}$ during the clutch-to-clutch shifting action. In the tie-up control in S4, the clutch-to-clutch shifting action of the automatic transmission 20 is effected with no or minimum racing of the input speed $N_{IN}$. Accordingly, the learning control of the engaging pressures of the coupling devices to be released and engaged for the next occurrence of the same clutch-to-clutch shifting action, which is implemented in S3 on the basis of the racing amount F of the input speed $N_{IN}$, is not implemented in S4.

However, the clutch-to-clutch shifting action in the continuously-variable shifting state of the differential portion 11 may be effected in a heavy tie-up state, if the learning control of the engaging pressures is not implemented. In view of this risk, the engaging pressures of the coupling devices for the clutch-to-clutch shifting action are determined (set) in S4 on the basis of the engaging pressures of the coupling devices obtained by the learning control in S3. For example, the engaging pressure used in S4 is made higher by a predetermined amount obtained by experimentation, than the engaging pressure which has been updated by the learning control In S3 for racing of the input speed $N_{IN}$, so that the amount of overlapping of the engaging pressures of the coupling device is increased (so that the degree of the tie-up of the coupling devices is increased). The engaging pressures updated by the learning control for racing of the input speed $N_{IN}$ are obtained from one of the learning control maps, which one map corresponds to the engine torque $T_E$ and vehicle speed V closest to those during the clutch-to-clutch shifting action in question controlled in S4.

In S4, the first electric motor M1 and/or the second electric motor M2 is/are controlled to control the engine speed $N_E$, in synchronization with the clutch-to-clutch shifting action of the automatic transmission portion 20, namely, in synchronization with the initiation of the inertia phase of the clutch-to-clutch shifting action, such that the engine speed $N_E$ is held substantially constant owing to the differential operation, that is, an electric continuously-variable shifting operation of the differential portion in the inertia phase. For example, the shifting operation of the differential portion 11 is controlled by changing the speed ratio $\gamma 0$ of the differential portion 11 in a direction opposite to the direction of change of the speed ratio $\gamma$ of the automatic transmission portion 20, so that the engine speed $N_E$ is held substantially constant.

For determining whether the inertia phase is initiated in S4, the hybrid control means 52 determines whether the coupling device in its engaging action has begun to have an engaging torque capacity that initiates a change of the input speed $N_{IN}$. For example, this determination is made by determining whether the actual input speed $N_{IN}$ has changed by an amount predetermined by experimentation to detect the initiation of the inertia phase, whether a time predetermined by experimentation to detect the moment at which the coupling device in its engaging action has begun to have the engaging torque capacity, has passed, or whether the transient engaging hydraulic pressure of the coupling device in its engaging action has been raised to a level (commanded level) Pc predetermined by experimentation to detect the moment at which the coupling device in its engaging action has begun to have the engaging torque capacity.

In the example of FIG. 12, the clutch-to-clutch shifting action of the automatic transmission portion 20 is initiated at the point of time t1, with a drop of the releasing hydraulic pressure $P_{B2}$ of the second brake B2 which is the coupling device to be released. During the time period from the point of time t1 to the point of time t3, the engaging hydraulic pressure $P_{B1}$ of the first brake B1 which is the coupling device to be engaged is raised, and the engaging action of the first brake B1 is completed at the point of time t3, at which the shifting action of the automatic transmission portion 20 is terminated. The actual releasing hydraulic pressure $P_{B2}$ and the engaging hydraulic pressure $P_{B1}$ are determined on the basis of the releasing hydraulic pressure $P_{B2}$ and the engaging hydraulic pressure $P_{B1}$ obtained by the learning control for racing of the input speed $N_{IN}$ during the clutch-to-clutch shifting action, such that the actual hydraulic pressures $P_{B1}$ and $P_{B2}$ are higher than the values obtained by experimentation, by an amount predetermined by experimentation, so that the amount of overlapping of the engaging pressures (the degree of the tie-up of the coupling devices) is increased. The above-indicated releasing and engaging hydraulic pressures $P_{B2}$ and $P_{B1}$ obtained by the learning control for racing of the input speed $N_{IN}$ are obtained from one of the learning control maps, which one map corresponds to the engine torque $T_E$ and vehicle speed V closest to those during the clutch-to-clutch shifting action in question.

In the example of FIG. 12, there does not arise a racing rise of the input speed $N_{IN}$ of the automatic transmission portion 20 at the beginning of the inertia phase, which racing rise takes place in the example of FIG. 13. In the absence of the racing of the input speed $N_{IN}$, no learning control of the engaging pressures of the coupling devices is implemented for the next occurrence of the same clutch-to-clutch shifting action.

In the example of FIG. 12, the determination as to whether the inertia phase is initiated is made at the point of time t2, by determining whether the actual input speed $N_{IN}$ has changed by the amount predetermined by experimentation to detect the initiation of the inertia phase, whether the time predetermined by experimentation to detect the moment at which the coupling device in its engaging action has begun to have the engaging torque capacity, has passed, or whether the transient engaging hydraulic pressure of the coupling device in its engaging action has been raised to the level (commanded level) Pc predetermined by experimentation to detect the moment at which the coupling device in its engaging action has begun to have the engaging torque capacity.

During the time period from the point of time t2 to the point of time t3 in the time chart of FIG. 12, the first electric motor speed $N_{M1}$ is controlled by the differential function of the differential portion 11 in the inertia phase of the shifting action of the automatic transmission portion 20, to change the speed ratio of the differential portion 11 in the direction opposite to the direction of change of the speed ratio of the automatic transmission portion 20, in synchronization with the initiation of the inertia phase at the point of time t2, for preventing a change of the overall speed ratio γT of the transmission mechanism 10 before and after the shifting action of the automatic transmission portion 20, that is, for holding the engine speed $N_E$ substantially constant during the shifting action of the automatic transmission portion 20. In the inertia phase from the point of time t2 to the point of time t3, the second electric motor M2 may be controlled to positively change the input speed $N_{IN}$ in the predetermined manner, in the process of the shifting action of the automatic transmission portion 20, If a negative determination is obtained in S1, that is, if the automatic transmission portion 20 has not been commanded to perform a clutch-to-clutch shifting action, the control flow goes to S5 in which the electronic control device 40 performs various other control operations not associated with the clutch-to-clutch shifting action, or alternatively the present routine is terminated.

In the present embodiment described above, the differential portion 11 is switchable between the continuously-variable shifting state and the non-continuously-variable shifting state, by the differential limiting device in the form of the switching clutch C0 and switching brake B0 operable to limit the operation of the differential portion 11 as the electrically controlled continuously variable transmission. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the differential portion 11 is placed in the continuously-variable shifting state in a normal output state of the engine during a low-speed or medium-speed running or a low-output or medium-output running of the vehicle, for example, the fuel economy of the vehicle is improved. When the differential portion 11 is placed in the non-continuously-variable shifting state during a high-speed running of the vehicle, the output of the engine 8 is transmitted to the drive wheels primarily through the mechanical power transmitting path, so that the fuel economy is improved owing to reduction of a loss of conversion of a mechanical energy into an electric energy, which would take place when the differential portion 11 is operated as a transmission the speed ratio of which is electrically variable. Where the differential portion 11 is placed in the non-continuously-variable shifting state during a high-output running state of the vehicle, the differential portion 11 is operated as a transmission the speed ratio of which is electrically variable, only when the vehicle speed or output is relatively low or medium, so that the required amount of electric energy generated by the first electric motor M1, that is, the maximum amount of electric energy that must be transmitted from the first electric motor M1 can be reduced, making it possible to minimize the required sizes of the first electric motor M1 and the second electric motor M2 to which the electric energy is transmitted, and the required size of the transmission mechanism 10 including those electric motors.

The present embodiment is further arranged such that the engaging pressures of the coupling devices used for the clutch-to-clutch shifting action of the automatic transmission portion 20 are set, or determined by the learning control, to change the racing amount F of the input speed $N_{IN}$ of the automatic transmission portion 20 during the clutch-to-clutch shifting action under the control of the racing-amount control means 80, depending upon whether the operation of the differential portion 11 is placed in the continuously-variable shifting state or the non-continuously-variable shifting state. Since the clutch-to-clutch shifting action is controlled by the step-variable shifting control means 54, with the engaging pressures set or determined as described above, the generation of the shifting shock is reduced.

The present embodiment is further arranged such that the step-variable shifting control means 54 changes the racing amount of the input speed $N_{IN}$ of the automatic transmission portion 20 during the clutch-to-clutch shifting action such that the racing amount is smaller when the differential portion 11 is placed in the continuously-variable shifting state, than when the differential portion 11 is placed in the non-continuously-variable shifting state. In other words, the racing amount is changed to increase the amount of overlapping of the engaging pressures of the coupling devices during the clutch-to-clutch shifting action of the automatic transmission portion 20, when the differential portion 11 is switched to the continuously-variable shifting state. Accordingly, the racing amount of the input speed $N_{IN}$ of the automatic transmission portion 20 during its clutch-to-clutch shifting action is made smaller in the continuously-variable shifting state of the differential portion 11 than in the non-continuously-variable shifting state, so that the shifting action of the differential portion 11 in synchronization of the clutch-to-clutch shifting action of the automatic transmission portion 20 can be more suitably controlled, with the reduced shifting shock, in the continuously-variable shifting state of the differential portion 11.

The present embodiment is also arranged such that the step-variable shifting control means 54 controls the clutch-to-clutch shifting action of the automatic transmission portion 20 such that the clutch-to-clutch shifting action is performed in the tie-up state, when the differential portion 11 is placed in the continuously-variable shifting state, Accordingly, the racing amount of the input speed $N_{IN}$ of the automatic transmission portion 20 during its clutch-to-clutch shifting action is made smaller in the continuously-variable shifting state of the differential portion 11, so that the shifting action of the differential portion 11 in synchronization of the clutch-to-clutch shifting action of the automatic transmission portion 20 can be more suitably controlled, with the reduced shifting shock, in the continuously-variable shifting state of the differential portion 11.

The present embodiment is further arranged such that the step-variable shifting control means 54 controls the clutch-to-clutch shifting action of the automatic transmission portion 20 such that the clutch-to-clutch shifting action is performed in a state of racing rise of the input speed $N_{IN}$ of the automatic transmission portion 20, when the differential portion 11 is placed in the non-continuously-variable shifting state. Accordingly, the clutch-to-clutch shifting action of the automatic transmission portion 20 is accompanied with a racing rise of the input speed $N_{IN}$ of the automatic transmission portion 20, in the non-continuously-variable shifting state of the differential portion 11. The generation of the shifting shock can be reduced by the racing-amount control means 80 by suitably implementing the learning control of the engaging pressures of the coupling devices used for the clutch-to-clutch shifting action, so as to adjust the racing amount F of the input speed $N_{IN}$ during the clutch-to-clutch shifting action to a suitable value.

The present embodiment is also arranged such that the hybrid control means 52 restricts a change of the engine speed $N_E$ during the clutch-to-clutch shifting action of the automatic transmission portion 20, by controlling the first electric motor M1, in synchronization with the clutch-to-clutch shifting action, when the differential portion 11 is placed in the continuously-variable shifting state. Accordingly, the racing amount of the input speed $N_{IN}$ is prevented or minimized during the clutch-to-clutch shifting action in the continuously-variable shifting state of the differential portion 11, so that the shifting action of the differential portion 11 can be more suitably controlled by the hybrid control means 52 by controlling the first electric motor M1 so as to restrict a change of the engine speed $N_E$ during the clutch-to-clutch shifting action, in synchronization with the shifting action, whereby the generation of the shifting shock is reduced.

The other embodiments of the present invention will be described. In the following descriptions, the same reference signs as used in the preceding embodiment will be used to identify the corresponding elements which will not be described.

Embodiment 2

Figures 14, 15:
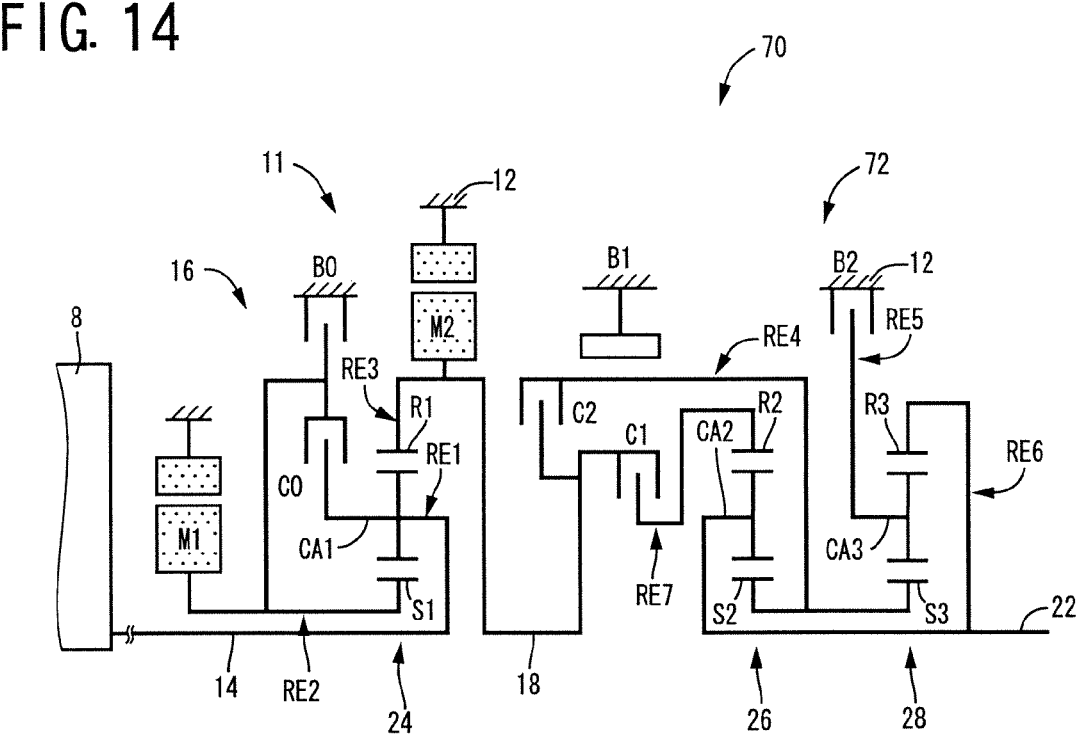
FIG. 14 is a schematic view corresponding to that of FIG. 1, for explaining an arrangement of a hybrid vehicle drive system according to another embodiment of the present invention.
FIG. 15 is a table corresponding to that of FIG. 2, indicating shifting actions of the hybrid vehicle drive system of FIG. 14, which is operable in a selected one of the continuously-variable and step-variable shifting states, in relation to different combinations of operating states of hydraulically operated frictional coupling devices to effect the respective shifting actions.
Figure 16:
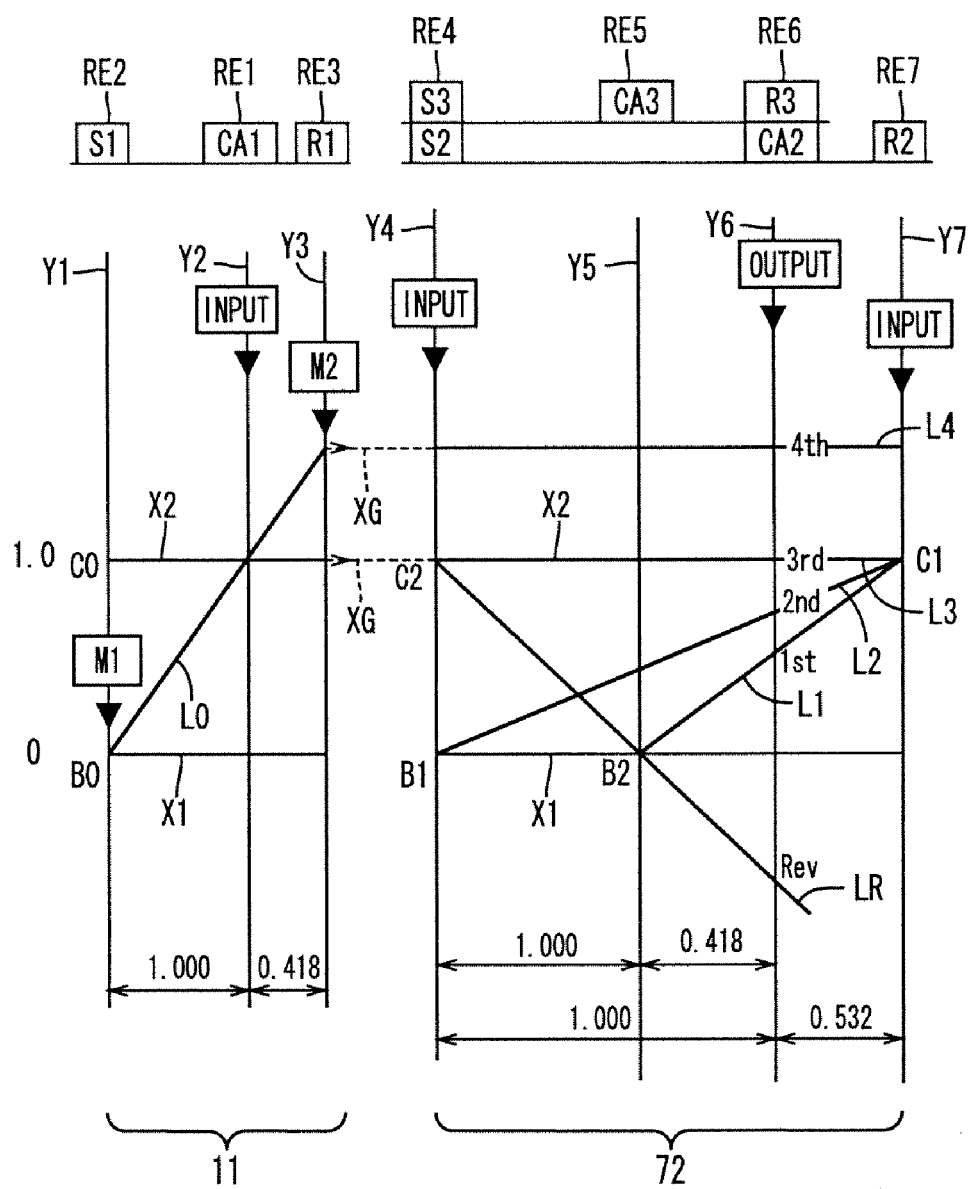
FIG. 16 is a collinear chart corresponding to that of FIG. 3, indicating relative rotating speeds of the rotary elements of the hybrid vehicle drive system of FIG. 14 in the step-variable shifting state, in the different gear positions.

FIG. 14 is a schematic view for explaining an arrangement of a transmission mechanism 70 in another embodiment of this invention, and FIG. 15 a table indicating a relationship between the gear positions of the transmission mechanism 70 and different combinations of engaged states of the hydraulically operated frictional coupling devices for respectively establishing those gear positions, while FIG. 16 is a collinear chart for explaining a shifting operation of the transmission mechanism 70.

The transmission mechanism 70 includes the differential portion 11 having the first electric motor M1, power distributing mechanism 16 and second electric motor M2, as in the preceding embodiment. The transmission mechanism 70 further includes an automatic transmission portion 72 having three forward drive positions. The automatic transmission portion 72 is interposed between the differential portion 11 and the output shaft 22 and is connected in series to the differential portion 11 through the power transmitting member 18. The power distributing mechanism 16 includes the single-pinion type first planetary gear set 24 having a gear ratio $\rho 1$ of about 0.418, for example, and the switching clutch C0 and the switching brake B0. The automatic transmission portion 72 includes the single-pinion type second planetary gear set 26 having a gear ratio $\rho 2$ of about 0.532, for example, and the single-pinion type third planetary gear set 28 having a gear ratio $\rho 3$ of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 15. Those gear positions have respective speed ratios $\gamma$ (input shaft speed $N_{14}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as the continuously variable transmission described above. In the present transmission mechanism 70, therefore, a step-variable transmission is constituted by the transmission portion 72, and the differential portion 11 which is placed in the fixed-speed-ratio shifting state by engagement of the switching clutch C0 or switching brake B0. Further, a continuously variable transmission is constituted by the transmission portion 72, and the differential portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio $\gamma 1$ of about 2.804, for example, is established by engaging actions of the switching clutch C0, first clutch C1 and second brake B2, and the second gear position having the speed ratio $\gamma 2$ of about 1.531, for example, which is lower than the speed ratio $\gamma 1$, is established by engaging actions of the switching clutch C0, first clutch C1 and first brake B1, as indicated in FIG. 15. Further, the third gear position having the speed ratio $\gamma 3$ of about 1.000, for example, which is lower than the speed ratio $\gamma 2$, is established by engaging actions of the switching clutch C0, first clutch C1 and second clutch C2, and the fourth gear position having the speed ratio $\gamma 4$ of about 0.705, for example, which is lower than the speed ratio $\gamma 3$, is established by engaging actions of the first clutch C1, second clutch C2, and switching brake B0. Further, the reverse gear position having the speed ratio $\gamma R$ of about 2.393, for example, which is intermediate between the speed ratios $\gamma 1$ and $\gamma 2$, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, as indicated in FIG. 15, so that the differential portion 11 functions as the continuously variable transmission, while the automatic transmission portion 72 connected in series to the differential portion 11 functions as the step-variable transmission, whereby the speed of the rotary motion transmitted to the automatic transmission portion 72 placed in one of the first through third gear positions, namely, the rotating speed of the power transmitting member 18 is continuously changed, so that the speed ratio of the transmission mechanism when the automatic transmission portion 72 is placed in one of those gear positions is continuously variable over a predetermined range. Accordingly, the total speed ratio of the automatic transmission portion 72 is continuously variable across the adjacent gear positions, whereby the overall speed ratio γT of the transmission mechanism 70 a whole is continuously variable.

FIG. 16 is a collinear chart which indicates, by straight lines, a relationship among the rotating speeds of the rotary elements in each of the gear positions of the transmission mechanism 70, which is constituted by the differential portion 11 functioning as the continuously-variable shifting portion or first shifting portion, and the automatic transmission portion 72 functioning as the step-variable shifting portion or second shifting portion. The collinear chart of FIG. 16 indicates the rotating speeds of the individual elements of the power distributing mechanism 16 when the switching clutch C0 and brake B0 are both released, and the rotating speeds of those elements when the switching clutch C0 or brake B0 is engaged, as in the preceding embodiment.

In FIG. 16, four vertical lines Y4, Y5, Y6 and Y7 corresponding to the automatic transmission portion 72 and arranged in the rightward direction respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the automatic transmission portion 72, the fourth rotary element RE4 is selectively connected to the power transmitting member 18 through the second clutch C2, and is selectively fixed to the casing 12 through the first brake B1, and the fifth rotary element RE5 is selectively fixed to the casing 12 through the second brake B2. The sixth rotary element RE6 is fixed to the output shaft 22 of the automatic transmission portion 72, and the seventh rotary element RE7 is selectively connected to the power transmitting member 18 through the first clutch C1.

When the first clutch C1 and the second brake B2 are engaged, the automatic transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1, as indicated in FIG. 16. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the differential portion 11. When the switching brake B0 is engaged in place of the switching clutch C0, the sixth rotary element RE6 is rotated at a speed higher than the engine speed $N_E$, with the drive force received from the differential portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 according to the present embodiment is also constituted by the differential portion 11 functioning as the continuously-variable shifting portion or first shifting portion, and the automatic transmission portion 72 functioning as the step-variable (automatic) shifting portion or second shifting portion, and the output shaft 22 is provided with the third electric motor M3, so that the present transmission mechanism 70 has advantages similar to those of the first embodiment.

Embodiment 3

Figure 17:
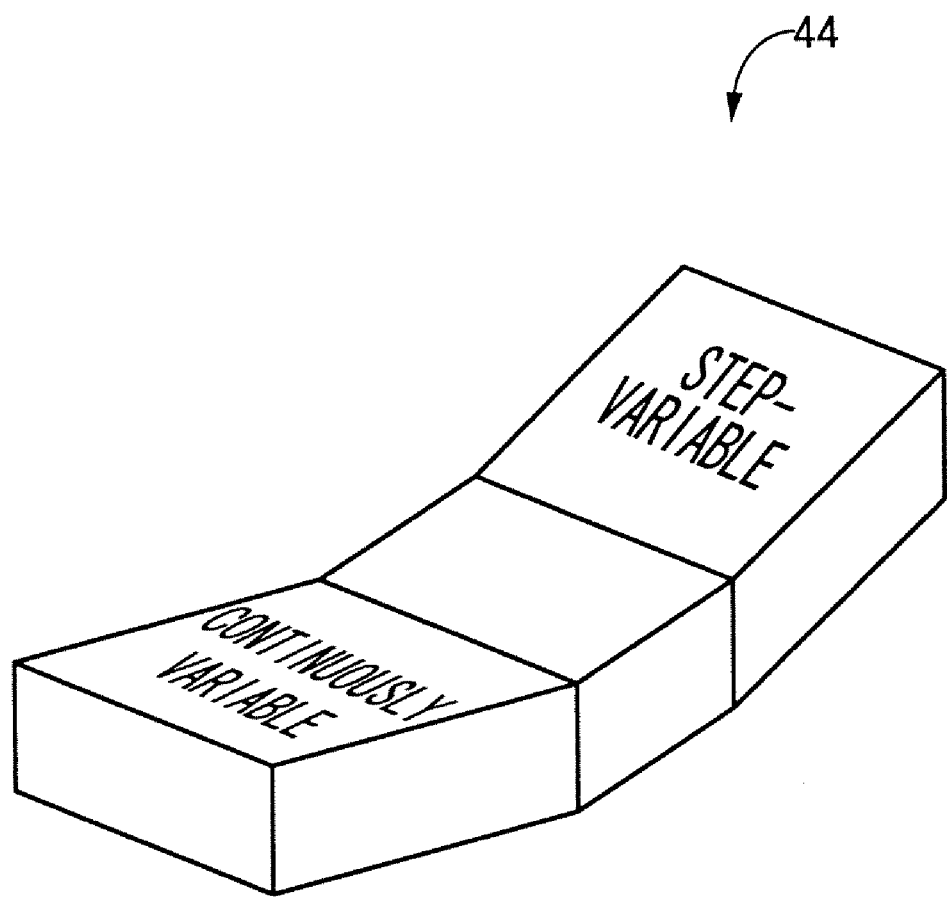
FIG. 17 is a perspective view showing an example of a manually operable shifting-state selecting device in the form of a seesaw switch operated by a user to select the shifting state.

FIG. 17 shows an example of a seesaw switch 44 (hereinafter referred to as "switch 44") functioning as a shifting-state selecting device manually operable to select the differential state (non-locked state) or non-differential state (locked state) of the power distributing mechanism 16, that is, to select the continuously-variable shifting state or step-variable shifting state of the transmission mechanism 10. This switch 44 permits the user to select the desired shifting state during running of the vehicle. The switch 44 has a continuously-variable-shifting running button labeled "CONTINUOUSLY-VARIABLE" for running of the vehicle in the continuously-variable shifting state, and a step-variable-shifting running button labeled "STEP-VARIABLE" for running of the vehicle in the step-variable shifting state, as shown in FIG. 17. When the continuously-variable-shifting running button is depressed by the user, the switch 44 is placed in a continuously-variable shifting position for selecting the continuously-variable shifting state in which the transmission mechanism 10 is operable as the electrically controlled continuously variable transmission. When the step-variable-shifting running button is depressed by the user, the switch 44 is placed in a step-variable shifting position for selecting in the step-variable shifting state in which the transmission mechanism is operable as the step-variable transmission.

In the preceding embodiments, the shifting state of the transmission mechanism 10 is automatically switched on the basis of the vehicle condition and according to the switching boundary line map shown in FIG. 6 by way of example. However, the shifting state of the transmission mechanism 10, 70 may be switched by a manual operation of the switch 44, in place of or in addition to the automatic switching operation. Namely, the switching control means 50 may be arranged to selectively place the transmission mechanism 10 in the continuously-variable shifting state or the step-variable shifting state, depending upon whether the switch 44 is placed in its continuously-variable shifting position or step-variable shifting position. For instance, the user manually operates the switch 44 to place the transmission mechanism 10 in the continuously-variable shifting state when the user likes the transmission mechanism 10 to operate as a continuously variable transmission or wants to improve the fuel economy of the engine, or alternatively in the step-variable shifting state when the user likes a rhythmical change of the engine speed as a result of a shifting action of the step-variable transmission.

The switch 44 may have a neutral position in which none of the continuously-variable and step-variable shifting states are selected. In this case, the switch 44 may be placed in its neutral position when the user has not selected the desired shifting state or likes the transmission mechanism 10 to be automatically placed in one of the continuously-variable and step-variable shifting states.

Where the shifting state of the transmission mechanism 10 is not automatically selected, but is manually selected by a manual operation of the switch 44, step S2 in the flow chart of FIG. 11 is formulated such that the determination as to whether the power distributing mechanism 16 is placed in the non-differential state, that is, whether the differential portion 11 is placed in the non-continuously-variable shifting state, is effected depending upon whether the switch 44 has been operated to select the non-differential state of the power distributing mechanism 16, that is, the step-variable shifting state of the differential portion 11.

While the preferred embodiments of this invention have been described in detail by reference to the accompanying drawings, it is to be understood that the present invention may be otherwise embodied.

In the preceding embodiments, the racing-amount control means 80 increases the engaging pressures of the released coupling device and the engaged coupling device used for the next clutch-to-clutch shifting action of the automatic transmission portion 20, for reducing the racing amount F by a suitable amount, if the racing amount F in the present clutch-to-clutch shifting action is larger than the predetermined value. However, the racing-amount control means 80 may be arranged to implement a real-time control of the racing amount F of the input speed $N_{IN}$, in addition to the above-indicated learning control. For instance, the racing-amount control means 80 may include torque-reduction control means (not shown) for reducing the torque to be transmitted to the drive wheels 38.

For example, the torque-reduction control means is arranged to apply an engine-torque reducing command to the hybrid control means 52, for reducing the opening angle of the electronic throttle valve 96, or the amount of fuel supply by the fuel injecting device 98, or retarding the timing of ignition of the engine 8 by the ignition device 99, to thereby reduce the engine torque $T_E$, and to reduce the torque to be transmitted to the drive wheels 38, for example, the input torque $T_{IN}$ of the automatic transmission portion 20 or the output torque $T_{OUT}$ of the automatic transmission portion 20. The torque-reduction control means may be arranged to apply an electric-motor-torque reducing command, in addition to or in place of the engine-torque reducing command, to the hybrid control means 52, for controlling the second electric motor M2 through the inverter 58, so as to generate a reverse drive torque, or a regenerative braking torque while charging the electric-energy storage device 60, for thereby reducing the torque to be transmitted to the drive wheels 38. The torque-reduction control means restricts the racing amount F of the input speed $N_{IN}$ by reducing the torque to be transmitted to the drive wheels 38, when the racing amount F of the input speed $N_{IN}$ is larger than the predetermined value.

The switching control means 50 in the illustrated embodiments is arranged to fully engage the switching clutch C0 or switching brake B0 for placing the differential portion 11 in the non-differential state (locked state) in which the differential portion 11 does not perform the differential function, for thereby limiting the operation of the differential portion 11 as the electrically controlled continuously variable transmission (differential device). However, the switching control means 50 may be arranged to control the torque capacity of the switching clutch C0 or switching brake B0, for example, to partially engage the switching clutch C0 or switching brake B0 for limiting the operation of the differential portion 11 as the electrically controlled differential device, to thereby place the differential portion 11 in the non-differential state (locked state). Described more specifically, the switching control means 50 may be arranged to partially engage the switching clutch C0 or switching brake B0 to transmit a partial engagement torque, which cooperates with the torque generated by the first electric motor M1, to produce a reaction torque with respect to the engine torque $T_E$ received by the differential portion 11, while permitting the operation of the differential portion 11 as the electrically controlled continuously variable transmission (differential device).

In the arrangement described above, the differential portion 11 can receive the engine torque $T_E$ exceeding the predetermined upper limit TE1 that the torque capacity of the first electric motor M1 can withstand. This arrangement makes it possible to increase the output of the differential portion 11, without having to increase the maximum torque capacity of the first electric motor M1, that is, without an increase of the required size of the first electric motor M1.

Further, the first electric motor M1 is not required to withstand the reaction torque with respect to the entire engine torque $T_E$ received by the differential portion 11, since the switching clutch C0 or switching brake B0 is not placed in the released state, in the above-described arrangement. Accordingly, it is possible to reduce a percentage of a portion of the engine torque $T_E$ which the first electric motor M1 should withstand, with respect to the entire engine torque $T_E$ received by the differential portion 11, making it possible to reduce the size of the first electric motor M1, improve the durability of the first electric motor M1, or reduce the amount of electric energy supplied from the first electric motor M1 to the second electric motor M2, thereby improving the durability of the second electric motor M2 as well.

Further, the switching control means 50 may be arranged to partially engage the switching clutch C0 or switching brake B0, irrespective of whether the vehicle condition is in the continuously-variable shifting region in which the differential portion 11 should be placed in the continuously-variable shifting state, or in the step-variable shifting region in which the differential portion 11 should be placed in the non-continuously-variable shifting state.

In the preceding embodiments, the shifting action of the differential portion 11 is controlled in its differential state, such that the engine speed $N_E$ is held substantially constant during the shifting action of the automatic transmission portion 20, that is, so as to prevent a change of the overall speed ratio of the transmission mechanism 10, as indicated in the time chart of FIG. 12. However, the engine speed $N_E$ need not be held substantially constant, but the change of the engine speed $N_E$ may be restricted so that the overall speed ratio γT is continuously changed. This modification enjoy the advantage of this invention to some extent.

The hybrid control means 52 in the preceding embodiments is arranged to control the shifting action of the differential portion 11 placed in the continuously-variable shifting state during the shifting action of the automatic transmission portion 54 under the control of the step-variable shifting control means 54, such that the engine speed $N_E$ is held substantially constant, for example, to assure a continuous change of the overall speed ratio γT before and after the shifting action of the automatic transmission portion 20, for the purpose of reducing the shifting shock and improving the fuel economy. However, the hybrid control means 52 may be arranged to control the shifting action of the differential portion 11 so as to permit a stepping (non-continuous) change rather than the continuous change of the overall speed ratio γT, where the vehicle operator feels more comfortable with a high shifting response.

Where the automatic transmission portion 20 is shifted as a result of a change of the required output torque $T_{OUT}$ caused by a rapid depressing or releasing action of the accelerator pedal, for example, it is desirable to improve the shifting response by a stepping (non-continuous) change of the overall speed ratio γT.

Where the required amount of change of the overall speed ratio γT before and after the shifting action of the automatic transmission portion 20 is small or substantially zero, it is desirable to continuously change the actual overall speed ratio γT before and after the shifting action of the automatic transmission portion 20, for reducing the shifting shock and improving the fuel economy, rather than improving the shifting response. Where the required amount of change of the overall speed ratio γT before and after the shifting action of the automatic transmission portion 20 is large, it is desirable not to continuously change the actual overall speed ratio γT before and after the shifting action of the automatic transmission portion 20, that is, to effect a stepping change of the actual overall speed ratio γT. Considered from another point of view, the vehicle operator feels comfortable with a stepping change of the actual overall speed ratio γT where the required amount of change of the overall speed ratio γT before and after the shifting action of the automatic transmission portion 20 is large upon rapid depressing or releasing action of the accelerator pedal, for example. In this case, therefore, it is desirable to effect a stepping change of the actual overall speed ratio γT by effecting a stepping change of the speed ratio γof the automatic transmission 20.

Described in detail, the hybrid control means 52 is arranged to control the shifting action of the differential portion 11 without synchronization with, that is, independently with the shifting of the automatic transmission portion 20, so as to change the overall speed ratio γT toward the target value, rather than continuously changing the overall speed ratio γT by changing the speed ratio γ0 of the differential portion 11 according to a change of the speed ratio γ of the automatic transmission portion 20, in synchronization with the shifting action of the automatic transmission portion 20, during the shifting action of the automatic transmission portion 20 under the control of the step-variable shifting control means 54, when the required amount of change of the overall speed ratio γT is large and when differential-state determining means 82 determines that the differential portion 11 is placed in the continuously-variable shifting state. This arrangement permits a change of the actual overall speed ratio γT toward the target value, by utilizing the stepping change of the speed ratio of the automatic transmission portion 20, and by adding (or subtracting) a change of the speed ratio of the differential portion 11 to (from) the change of the speed ratio of the automatic transmission portion 20. Accordingly, the actual overall speed ratio γT can be changed in steps before and after the shifting action of the automatic transmission portion 20, so that the shifting response is improved.

The required amount of change of the overall speed ratio γT exceeds a predetermined value where the accelerator pedal is depressed or released by a large amount, for example. In this case, it is desirable to effect a non-continuous change, namely, a stepping change of the actual overall speed ratio γT. The predetermined value indicated above is a threshold which is obtained by experimentation and above which it is considered that the vehicle operator feels more comfortable with the non-continuous or stepping change of the actual overall speed ratio γT In the preceding embodiments, the locked-state determining means 84 (step S2 of FIG. 11) is configured to make the determination as to whether the power distributing mechanism 16 is placed in the locked state or not, by determining whether the vehicle condition lies in the step-variable shifting region represented by the switching boundary line map shown in FIG. 6 by way of example. However, the determination by the locked-state determining means 84 as to whether the power distributing mechanism 16 is placed in the locked state or not may be made on the basis of the determination by the switching control means 50 as to whether the transmission mechanism 10 should be placed in the step-variable or continuously-variable shifting state.

In the illustrated embodiments, the transmission mechanism 10, 70 is switchable between its continuously-variable shifting state and the step-variable shifting states by placing the differential portion 11 (power distributing mechanism 16) selectively in one of its differential state in which the differential portion is operable as the electrically controlled continuously variable transmission, and the non-differential state (locked state) in which the differential portion 11 is not operable as the step-variable transmission. However, the differential portion 11 placed in its differential state can be operable as the step-variable transmission the speed ratio of which is variable in steps rather than continuously. In other words, the differential and non-differential states of the differential portion 11 do not respectively correspond to the continuously-variable and step-variable shifting states of the transmission mechanism 10, 70, and therefore the differential portion 11 need not be switchable between the continuously-variable and step-variable shifting states. The principle of this invention is applicable to any transmission mechanism 10, 70 (differential portion 11 or power distributing mechanism 16) which is switchable between the differential and non-differential states.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18, respectively, through gears or belts. Although the power distributing mechanism 16 in the illustrated embodiments is provided with the switching clutch C0 and switching brake B0, the power distributing mechanism 16 need not be provided with both of the switching clutch C0 and switching brake B0. While the switching clutch C0 is provided to selectively connect the first sun gear S1 and the first carrier CA1 to each other, the switching clutch C0 may be provided to selectively connect the first sun gear S1 and the first ring gear R1 to each other, selectively connect the first carrier CA1 and the first ring gear R1. Namely, the switching clutch C0 may be arranged to connect any two element of the three elements of the first planetary gear set 24.

While the switching clutch C0 is engaged to establish the neutral position N in the transmission mechanism 10, 70 in the illustrated embodiments, the switching clutch C0 need not be engaged to establish the neutral position.

The hydraulically operated frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

While the second electric motor M2 is connected to the power transmitting member 18 in the illustrated embodiments, the second electric motor M2 may be connected to a rotary member of the automatic transmission portion 20, 72.

In the illustrated embodiments, the automatic transmission portion 20, 72 is disposed in the power transmitting path between the drive wheels 38, and the power transmitting member 18 which is the output member of the differential portion 11 or power distributing mechanism 16. However, the automatic transmission portion 20, 72 may be replaced by any other type of power transmitting device such an automatic transmission which is a permanent-mesh parallel-two-axes type transmission well known as a manual transmission and which is automatically shifted by select cylinders and shift cylinders.

While the automatic transmission portion 20, 72 in the preceding embodiments is connected in series to the differential portion 11 through the power transmitting member 18, the automatic transmission portion 20, 72 may be mounted on and disposed coaxially with a counter shaft which is parallel to the input shaft 14. In this case, the differential portion 11 and the automatic transmission portion 20, 72 are operatively connected to each other through a suitable power transmitting device or a set of two power transmitting members such as a pair of counter gears, and a combination of a sprocket wheel and a chain.

The power distributing mechanism 16 provided as a differential mechanism in the preceding embodiments may be replaced by a differential gear device including a pinion rotated by the engine 8, and a pair of bevel gears which mesh with the pinion and which are respectively operatively connected to the first electric motor M1 and the power transmitting member 18.

While the power distributing mechanism 16 in the illustrated embodiments is constituted by one planetary gear set 24, it may be constituted by two or more planetary gear sets so that the power distributing mechanism 16 is operable as a transmission having three or more gear positions in the non-differential state (fixed-speed-ratio shifting state).

In the illustrated embodiments, the manually operable shifting device 46 is provided with the shift lever 48 manually operable to select one of a plurality of operating positions. However, the shift lever 48 may be replaced by pushbutton switches, a slide-type or any other type of switch manually operable to select a desired one of a plurality of operating positions, or by devices not operated by hand, such as a device operated in response to a voice of the vehicle operator or operated by foot, to select one of a plurality of operating positions. Although the shift lever 48 has the manual forward-drive position M for selecting the number of the forward-drive gear positions available for automatic shifting of the automatic transmission portion 20, 72, the shift lever 48 placed in the manual forward-drive position M may be used to manually shift up or down the automatic transmission portion 20, 72, within the range from the first gear position through the fourth gear position, by operating the shift lever 48 from the position M to the shift-up position "+" or shift-down position "−".

While the switch 44 is of a seesaw type switch in the preceding embodiments, the seesaw switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The seesaw switch 44 may or may not have a neutral position. Where the seesaw switch 44 does not have the neutral position, an additional switch may be provided to enable and disable the seesaw switch 44. The function of this additional switch corresponds to the neutral position of the seesaw switch 44. The seesaw switch 44 may be replaced by a switching device operable by a voice generated by the vehicle operator or a foot of the vehicle operator, rather than by hand, to select one of the continuously-variable shifting state (differential state) and the step-variable shifting state (non-differential state).

It is to be understood that the embodiments of the invention have been descried for illustrative purpose only, and that the present invention may be embodied with various changes and modifications which may occur to those skilled in the art.

The invention claimed is:

1. A control apparatus for a vehicular drive system including a continuously-variable transmission portion operable as an electrically controlled continuously variable transmission, and a step-variable transmission portion, said continuously variable transmission portion having a differential mechanism operable to distribute an output of an engine to a first electric motor and a power transmitting member, a second electric motor disposed in a power transmitting path between the power transmitting member and a drive wheel of a vehicle, and a differential-state limiting device provided in said differential mechanism and operable to limit a differential function of said differential mechanism, for limiting an operation of said continuously-variable transmission portion as said electrically controlled continuously variable transmission, said step-variable transmission portion constituting a part of said power transmitting path and functioning as a step-variable transmission operable to perform a clutch-to-clutch shifting action by a releasing action of a coupling device and an engaging action of another coupling device, said control apparatus comprising:

a step-variable shifting control portion configured to change an amount of racing of an input speed of said step-variable transmission portion during said clutch-to-clutch shifting action, depending upon whether the operation of said continuously-variable transmission portion as said electrically controlled continuously variable transmission is limited by said differential-state limiting device.

2. The control apparatus according to claim 1, wherein said step-variable shifting control portion changes the amount of racing of the input speed of said step-variable transmission portion during said clutch-to-clutch shifting action such that said amount of racing is smaller when said continuously-variable transmission portion is placed in a continuously-variable shifting state in which the continuously-variable transmission portion is operable to perform a continuously-variable shifting action, without limitation of the operation of the continuously-variable transmission portion as the electrically controlled continuously variable transmission, than when the continuously-variable transmission portion is placed in a non-continuously-variable shifting state in which the continuously-variable transmission portion is not operable to perform the continuously-variable shifting action with the limited operation of the continuously-variable transmission portion as the electrically controlled continuously variable transmission.

3. The control apparatus according to claim 1, wherein said step-variable shifting control portion controls said clutch-to-clutch shifting action of said step-variable transmission portion such that said clutch-to-clutch shifting action is performed in a tie-up state, when said continuously-variable transmission portion is placed in a continuously-variable shifting state in which the continuously-variable transmission portion is operable to perform a continuously-variable shifting action while the operation of the continuously-variable transmission portion as the electrically controlled continuously variable transmission is not limited by said differential-state limiting device.

4. The control apparatus according to claim 1, wherein said step-variable shifting control portion controls said clutch-to-clutch shifting action of said step-variable transmission portion such that said clutch-to-clutch shifting action is performed in a state of racing rise of the input speed of said step-variable transmission portion, when said continuously-variable transmission portion is placed in a non-continuously-variable shifting state in which the continuously-variable transmission portion is not operable to perform a continuously-variable shifting action while the operation of the continuously-variable transmission portion as the electrically controlled continuously variable transmission is limited by said differential-state limiting device.

5. The control apparatus according to claim 1, further comprising electric-motor control portion configured to restrict a change of a speed of said engine during said clutch-to-clutch shifting action of said step-variable transmission portion, by controlling said first electric motor, in synchronization with said clutch-to-clutch shifting action, when said continuously-variable transmission portion is placed in a continuously-variable shifting state in which the continuously-variable transmission portion is operable to perform a continuously-variable shifting action while the operation of the continuously-variable transmission portion as the electrically controlled continuously variable transmission is not limited by said differential-state limiting device.

6. The control apparatus according to claim 1, further comprising switching control means configured to control said differential-state limiting device to selectively place said continuously-variable transmission portion in one of a continuously-variable shifting state in which the continuously-variable transmission portion is operable to perform a continuously-variable shifting action while the operation of the continuously-variable transmission portion as the electrically controlled continuously variable transmission is not limited by said differential-state limiting device, and a non-continuously-variable shifting state in which the continuously-variable transmission portion is not operable to perform the continuously-variable shifting action with the operation of the continuously-variable transmission portion as the electrically controlled continuously variable transmission is limited by said differential-state limiting device.

7. The control apparatus according to claim 6, wherein said switching control means controls said differential-state limiting device to selectively place said continuously-variable transmission portion in one of said continuously-variable and non-continuously-variable shifting states, on the basis of an output of said step-variable transmission portion.

8. The control apparatus according to claim 6, wherein said switching control means controls said differential-state limiting device to selectively place said continuously-variable transmission portion in one of said continuously-variable and non-continuously-variable shifting states, on the basis of an output torque of said engine.

9. The control apparatus according to claim 6, wherein said switching control means controls said differential-state limiting device to selectively place said continuously-variable transmission portion in one of said continuously-variable and non-continuously-variable shifting states, on the basis of a running speed of said vehicle.

10. The control apparatus according to claim 1, wherein said differential-state limiting device is configured to place said differential mechanism in a differential state in which the differential mechanism performs a differential function, for thereby placing said continuously-variable transmission portion in a continuously-variable shifting state in which the continuously-variable transmission portion is operable as the electrically controlled continuously variable transmission, and to place the differential mechanism in a non-differential state in which the differential mechanism does not perform the differential function, for thereby placing the continuously-variable transmission portion in a non-continuously-variable shifting state in which the continuously-variable transmission portion is not operable as the electrically controlled continuously variable transmission.

11. The control apparatus according to claim 1, wherein said differential mechanism has a first element connected to the engine, a second element connected to the first electric motor and a third element connected to the power transmitting member, and said differential-state limiting device is operable to place the differential mechanism in a differential state in which said first, second and third elements of the differential mechanism are rotatable relative to each other, and to place the differential mechanism in a non-differential state in which at least said second and third elements are not rotatable at respective different speeds.

12. The control apparatus according to claim 11, wherein said differential-state limiting device includes a clutch operable to connect any two of the first, second and third elements of the differential mechanism to each other for rotating the first, second and third elements as a unit, and/or a brake operable to fix the second element to a stationary member for holding the second element stationary.

13. The control apparatus according to claim 12, wherein said clutch and brake are released to place said differential mechanism in the differential state in which at least said second and third elements are rotatable at respective different speeds, and in which the differential mechanism is operable as an electrically controlled differential device.

14. The control apparatus according to claim 11, wherein said differential mechanism is a planetary gear set, and the first element is a carrier of the planetary gear set, and the second element is a sun gear of the planetary gear set, while the third element is a ring gear of the planetary gear set.

15. The control apparatus according to claim 14, wherein said planetary gear set is of a single-pinion type.

16. The control apparatus according to claim 1, wherein the vehicular drive system has an overall speed ratio defined by a speed ratio of said continuously-variable transmission portion and a speed ratio of the step-variable transmission portion.

17. A control apparatus for a vehicular drive system including a differential portion and a step-variable transmission portion, said differential portion having a differential mechanism operable to distribute an output of an engine to a first electric motor and a power transmitting member, a second electric motor disposed in a power transmitting path between the power transmitting member and a drive wheel of a vehicle, and a differential-state limiting device provided in said differential mechanism and operable to limit a differential function of said differential mechanism, for limiting an operation of said continuously-variable transmission portion as said electrically controlled continuously variable transmission, said step-variable transmission portion constituting a part of said power transmitting path and functioning as a step-variable transmission operable to perform a clutch-to-clutch shifting action by a releasing action of a coupling device and an engaging action of another coupling device, said control apparatus comprising:
a step-variable shifting control portion configured to change an amount of racing of an input speed of said step-variable transmission portion during said clutch-to-clutch shifting action, depending upon whether the differential function of said differential portion is limited by said differential-state limiting device.

18. The control apparatus according to claim 17, wherein said step-variable shifting control portion changes the amount of racing of the input speed of said step-variable transmission portion during said clutch-to-clutch shifting action such that said amount of racing is smaller when said differential portion is placed in a continuously-variable shifting state in which the differential portion is operable to perform a continuously-variable shifting action while the differential function of the differential portion is not limited by said differential-state limiting device, than when the differential portion is placed in a non-continuously-variable shifting state in which the differential portion is not operable to perform the continuously-variable shifting action while the differential function of the differential portion is limited by said differential-state limiting device.

19. The control apparatus according to claim 17, wherein said step-variable shifting control portion controls said clutch-to-clutch shifting action of said step-variable transmission portion such that said clutch-to-clutch shifting action is performed in a tie-up state, when said differential portion is placed in a continuously-variable shifting state in which the differential portion is operable to perform a continuously-variable shifting action while the differential function of the differential portion is not limited by said differential-state limiting device.

20. The control apparatus according to claim 17, wherein said step-variable shifting control portion controls said clutch-to-clutch shifting action of said step-variable transmission portion such that said clutch-to-clutch shifting action is performed in a state of racing rise of the input speed of said step-variable transmission portion, when said differential portion is placed in a non-continuously-variable shifting state in which the differential portion is not operable to perform a continuously-variable shifting action while the differential function of the differential portion is limited by said differential-state limiting device.

21. The control apparatus according to claim 17, further comprising electric-motor control portion configured to restrict a change of a speed of said engine during said clutch-to-clutch shifting action of said step-variable transmission portion, by controlling said first electric motor, in synchronization with said clutch-to-clutch shifting action, when said differential portion is placed in a continuously-variable shifting state in which the differential portion is operable to perform a continuously-variable shifting action while the differential function of the differential portion is not limited by said differential-state limiting device.

22. The control apparatus according to claim 17, wherein said differential-state limiting device is a differential-state switching device operable to switch said differential mechanism between a differential state in which the differential mechanism performs the differential function, for thereby placing said differential portion in a differential state in which the differential portion is operable to perform a differential function, and a non-differential state in which the differential mechanism does not perform the differential function, for thereby placing the differential portion in a non-differential state in which the differential portion is not operable to perform a differential function.

23. The control apparatus according to claim 17, wherein the vehicular drive system has an overall speed ratio defined by a speed ratio of the differential portion and a speed ratio of the step-variable transmission portion.

\* \* \* \* \*